US006384146B1

(12) United States Patent
Ruckenstein et al.

(10) Patent No.: US 6,384,146 B1
(45) Date of Patent: May 7, 2002

(54) GRAFT, GRAFT-BLOCK, BLOCK-GRAFT, AND STAR-SHAPED COPOLYMERS AND METHODS OF MAKING THEM

(75) Inventors: Eli Ruckenstein; Hongmin Zhang, both of Amherst, NY (US)

(73) Assignee: The Research Foundation of State University of New York, Amherst, NY (US)

( * ) Notice: Subject to any disclaimer, the term of this patent is extended or adjusted under 35 U.S.C. 154(b) by 0 days.

(21) Appl. No.: 09/542,762

(22) Filed: Apr. 4, 2000

Related U.S. Application Data

(60) Provisional application No. 60/127,796, filed on Apr. 5, 1999.

(51) Int. Cl.[7] ..................... C08F 255/02; C08F 287/00; C08F 265/06
(52) U.S. Cl. ................. 525/242; 525/244; 525/247; 525/249; 525/309; 525/310; 526/151
(58) Field of Search .............................. 525/242, 244, 525/247, 249, 309, 310; 526/151

(56) References Cited

U.S. PATENT DOCUMENTS

| | | |
|---|---|---|
| 4,346,193 A | 8/1982 | Warfel |
| 5,807,937 A * | 9/1998 | Matyjaszewski et al. ... 526/145 |

OTHER PUBLICATIONS

Ruckenstein et al., "Block–Graft and Star–Shaped Copolymers by Continuous Transformation from Anionic to Cationic Polymerization," *Macromolecules* 31:2977–2982 (1998) Pub. data May 5, 1998.

Zhang et al., "Graft Copolymers by Combined Anionic and Cationic Polymerizations Based on the Homopolymerization of a Bifunctional Monomer," *Macromolecules* 31:746–752 (1998).

\* cited by examiner

*Primary Examiner*—James J. Seidleck
*Assistant Examiner*—Olga Asinovsky
(74) *Attorney, Agent, or Firm*—Nixon Peabody LLP

(57) ABSTRACT

The present invention relates to a continuous method of preparing a block-graft or star-shaped copolymer. This method involves providing a living polymer, mixing the living polymer with a first monomer under conditions effective to produce a block copolymer, wherein the first monomer includes a polymerization site and a polymerization initiation site, and mixing the block copolymer with a second monomer under conditions effective to produce a block-graft or star-shaped copolymer. The present invention also relates to a continuous method of preparing a graft or graft-block copolymer. This method involves mixing a first monomer and a second monomer under conditions effective to produce a copolymer of the first and second monomers, wherein the second monomer comprises a polymerization site and a polymerization initiation site, mixing the copolymer with a third monomer under conditions effective to produce a graft copolymer, and mixing the graft copolymer with a fourth monomer under conditions effective to produce a graft-block copolymer. The present invention also relates to graft, graft-block, block-graft, and star-shaped copolymers produced by the methods of the present invention.

34 Claims, 12 Drawing Sheets

(1) LIVING POLY(MMA)

(3) POLY(MMA-b-2)

(4) BLOCK-GRAFT OR STAR-SHAPED COPOLYMER

GRAFT, GRAFT-BLOCK, BLOCK-GRAFT, AND STAR-SHAPED COPOLYMERS AND METHODS OF MAKING THEM

This application claims the benefit of U.S. Provisional Patent Application Ser. No. 60/127,796, filed Apr. 5, 1999.

The subject matter of this application was made with support from the United States Government under Grant No. CTS-9616192 from the National Science Foundation. The United States Government may retain certain rights.

FIELD OF THE INVENTION

The present invention relates to graft, graft-block, block-graft, and star-shaped copolymers and continuous methods of making graft, graft-block, block-graft, and star-shaped copolymers.

BACKGROUND OF THE INVENTION

In recent years, great attention has been paid to graft copolymers, because of their unique molecular architecture, particular morphology, and increased number of applications (Rempp et al., *J. Anionic Polymerization*, McGrath, Ed., ACS Symposium Series 166, American Chemical Society, Washington, D.C. (1981); Sawamoto, *Int. J. Polym. Mater.* 15:197 et seq. (1991); Lubnin et al., *J. Macromol. Sci, Pure Appl. Chem.* A31:1943 et seq. (1994); Hashimoto et al., *Polym. J.* 22:312 et seq. (1990); Geetha et al., *Macromolecules* 26:4083 et seq. (1993)). They have been widely used for the preparation of compatibilizers for polymer blends (Oshea et al., *Polymer* 35:4190 et seq. (1994); Hagazy et al., *J. Polym. Sci., Polym. Chem.* 31:527 et seq. (1993); Osman et al., *Polym. Int.* 36:47 et seq. (1996); Yang et al., *J. Biomed. Mater. Res.* 31:281 et seq. (1996); Grutke et al., *Macromol. Chem. Phys.* 195:2875 et seq. (1994); Eisenbach et al., *Macromolecules* 28:2133 et seq. (1995)), membranes for separation of gases or liquids (Yamashita et al., *J. Appl. Polym. Sci.* 40:1445 et seq. (1990); Ruckenstein et al., *Macromolecules* 30:6852 et seq. (1997); Se et al., *Makromol. Chem., Macromol. Symp.* 25:249 et seq. (1989)), hydrogels (Se et al., *Macromolecules* 30:1570 et seq. (1997)), drug deliverers (Zhang et al., *Macromolecules* 31:746–752 (1998)), and thermoplastic elastomers (Aoshima et al., *Macromolecules* 22:1009 et seq. (1989)). A number of methods have been employed for their synthesis, such as the macromonomer method (Se et al., *Macromolecules* 30:1570 et seq. (1997); Zhang et al., *Macromolecules* 31:746–752 (1998); (Aoshima et al., *Macromolecules* 22:1009 et seq. (1989); Kishimoto et al., *Macromolecules* 22:3877 et seq. (1989); Kamigaito et al., *Macromolecules* 24:3988 et seq. (1991); Zhang et al., *J. Polym. Sci., Polym. Chem.* 35:2901 et seq. (1997)), radiation-induced polymerization (Varshney et al., *Macromolecules* 23:2618 et seq. (1990); Aoshima et al., *Polym. Bull.* 13:229 et seq. (1985); Norhay et al., *Block Copolymers* Academic, New York (1977)), ring-opening olefin metathesis polymerization (Fayt et al., *Macromolecules* 20:1442 et seq. (1987)), polycondensation reaction (Varshney et al., *Macromolecules* 25:4457 et seq. (1992)), and iniferter-induced polymerization (Kunkel et al., *Makromol. Chem., Macromol. Symp.* 60:315 et seq. (1992)). However, the living polymerization technique is undoubtedly most suitable for the preparation of well-defined graft copolymers, in which both the backbone and the side chains possess designed molecular weights and narrow molecular weight distributions and the position, the number of side chains, and the composition of the graft copolymer can be controlled.

The advances in living polymerization have made the design and preparation of multiple-composition copolymers, such as block and graft copolymers, possible (Rempp et al., *J. Anionic Polymerization*, McGrath, Ed., ACS Symposium Series 166, American Chemical Society, Washington, D.C. (1981); Sawamoto, *Int. J. Polym. Mater.* 15:197 et seq. (1991); Lubnin et al., *J. Macromol. Sci, Pure Appl. Chem.*, A91:1943 et seq. (1994)). Numerous block copolymers can be prepared by the sequential monomer addition technique. However, it is more difficult to prepare graft copolymers than block copolymers. Although a number of graft copolymers have been obtained (Hashimoto et al., *Polym. J.* 22:312 et seq. (1990); Geetha et al., *Macromolecules* 26:4083 et seq. (1993); Oshea et al., *Polymer* 35:4190 et seq. (1994); Hagazy et al., *J. Polym. Sci., Polym. Chem.* 31:527 et seq. (1993); Osman et al., *Polym. Int.* 36:47 et seq. (1996); Yang et al., *J. Biomed. Mater. Res.* 31:281 et seq. (1996); Grutke et al., *Macromol. Chem. Phys.* 195:2875 et seq. (1994); Eisenbach et al., *Macromolecules* 28:2133 et seq. (1995); Yamashita et al., *J. Appl. Polym. Sci.* 40:1445 et seq. (1990)), it was difficult to control the molecular weights of the backbone and side chains, the positions of the side chains, and their number. Even using a living polymerization technique, the graft copolymer was generally synthesized by a discontinuous route (Ruckenstein et al., *Macromolecules* 30:6852 et seq. (1997); Se et al., *Makromol. Chem., Macromol. Symp.* 25:249 et seq. (1989); Se et al., *Macromolecules* 30:1570 et seq. (1997)), in which the precursor polymer had to be separated from the polymerization solution and purified carefully. For example, Se and co-workers (Se et al., *Macromolecules* 30:1570 et seq. (1997)) prepared a well-defined block-graft copolymer using the living anionic polymerization method. A block copolymer consisting of polystyrene and poly-((4-vinylphenyl) dimethylvinylsilane) and living polyisoprene were first prepared separately, and their coupling reaction generated a graft copolymer. In this method, the unreacted polyisoprene had to be removed by repeated dissolution and precipitation. Besides the tedious and difficult process, the unavoidable introduction of impurities did not allow one to obtain a pure and well-defined graft copolymer. Recently, a graft copolymer was prepared consisting of a polymethacrylate backbone and poly(alkyl vinyl ether) side chains (Ruckenstein et al., *Macromolecules* 30:6852 et seq. (1997)), by using the anionic polymerization of 1-(isobutoxy)ethyl methacrylate followed by the cationic polymerization of alkyl vinyl ether. However, in that method, the poly(1-(isobutoxy)ethyl methacrylate) had to be isolated from its tetrahydrofuran (THF) solution and purified carefully before it was used as macroinitiator for the cationic polymerization of alkyl vinyl ether.

The incorporation of functional groups into the surface of polymer materials or into polymeric chains can greatly improve their properties. For instance, the direct introduction of new functionalities onto a polymer surface or the surface modification by grafting can change the surface hydrophilicity, hydrophobicity, biocompatibility, and adhesion (Galina, *Adv. Polym. Sci.*, 137:1 et seq. (1998)). The direct synthesis of well-defined graft copolymers with functional groups can control not only the properties of the surface, but also the molecular parameters, architecture, and composition of the polymer. However, well-defined graft copolymers containing functional side chains have seldom been prepared because of the difficulty in preparing living polymers with polar substituents.

The present invention is directed to overcoming the above-noted deficiencies in the prior art.

SUMMARY OF THE INVENTION

The present invention relates to a continuous method of preparing a block-graft or star-shaped copolymer. This method involves providing a living polymer, mixing the living polymer with a first monomer under conditions effective to produce a block copolymer, wherein the first monomer comprises a living polymerization site and a living polymerization initiation site, and mixing the block copolymer with a second monomer under conditions effective to produce a block-graft or star-shaped copolymer.

The present invention also relates to a block-graft or star-shaped copolymer having the formula:

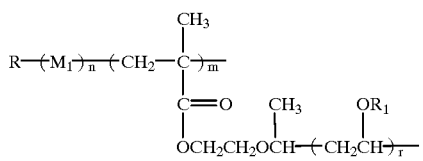

where n is an integer, m is an integer, r is an integer, and n, m, and r are a predetermined polymerization degree, R an alkyl, $R_1$ is selected from the group consisting of an alkyl, 2-chloroethyl, 2-acetoxyethyl, and 2-methacryloyloxyethyl, and $M_1$ is selected from the group consisting of styrene, α-methyl styrene, butadiene, isoprene, methyl methacrylate, ethyl methacrylate, butyl methacrylate, and tert-butyl methacrylate.

Another aspect of the present invention is a continuous method of preparing a graft copolymer. This method involves mixing a first monomer and a second monomer under conditions effective to produce a copolymer of the first and second monomers, wherein the first monomer comprises a polymerization site and a polymerization initiation site, and mixing the copolymer with a third monomer under conditions effective to produce a graft copolymer.

Yet another aspect of the present invention is a graft copolymer having the formula:

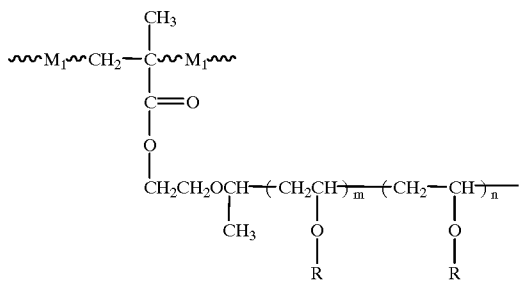

where m is an integer, n is an integer ≧0, R is the same or different and is selected from the group consisting of an alkyl, acetoxyethyl, chloroethyl, and methacryloyloxyethyl, and $M_1$ is selected from the group consisting of methyl methacrylate, ethyl methacrylate, propyl methacrylate, isopropyl methacrylate, butyl methacrylate, and tert-butyl methacrylate.

The present invention further relates to a continuous method of preparing a graft-block copolymer. This method involves mixing a first monomer and a second monomer under conditions effective to produce a copolymer of the first and second monomers, wherein the first monomer comprises a living polymerization site and a living polymerization initiation site, mixing the copolymer with a third monomer under conditions effective to produce a graft copolymer, and mixing the graft copolymer with a fourth monomer under conditions effective to produce a graft-block copolymer.

Another aspect of the present invention is a graft-block copolymer having the formula:

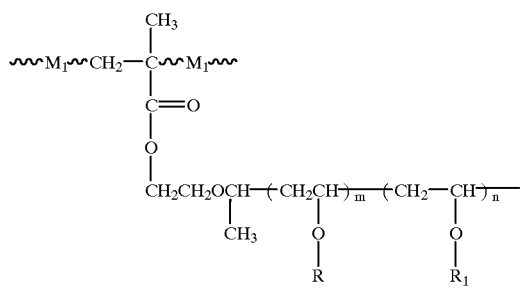

where m is an integer, n is an integer, R is the same or different and is selected from the group consisting of an alkyl, acetoxyethyl, chloroethyl, and methacryloyloxyethyl, $R_1$ is he same or different and is selected from the group consisting of an alkyl, acetoxyethyl, chloroethyl, and methacryloyloxyethyl, and $M_1$ is selected from the group consisting of methyl methacrylate, ethyl methacrylate, propyl methacrylate, isopropyl methacrylate, butyl methacrylate, and tert-butyl methacrylate.

The present invention discloses improved continuous methods for the synthesis of copolymers with controlled molecular weight and narrow molecular weight distribution, in which lengthy polymer separation and purification is no longer needed. In addition, the methods of the present invention allow the preparation of more complex molecular architectures, such as block-graft copolymers where: (1) the molecular weights of the backbone and side chains, hence the total molecular weight of the copolymer, can be controlled; (2) the side chains of the block-graft copolymer are located only in one part of the backbone, and their number can be selected; and (3) both the backbone and the side chains possess narrow molecular weight distributions.

BRIEF DESCRIPTION OF THE DRAWINGS

FIG. 1A shows a block-graft copolymer consisting of an AB block backbone and C side chains attached to the B segment.

DETAILED DESCRIPTION OF THE INVENTION

As used herein, living polymerization means a polymerization process during which only the propagating reaction of the monomer proceeds without the occurrence of side reactions, such as chain transfer or chain termination reactions.

As used herein a living polymer is a polymer in which, during a polymerization process, after the monomer is consumed completely, the propagating site retains its reactivity and when new monomer is added, the propagating reaction can proceed again.

As used herein, a polymerization site is a group in a compound which can undergo polymerization. For example, the vinyl groups (C=C) in styrene, α-methyl styrene, and alkyl methacrylate are polymerization sites. A living polymerization site is a group contained in a compound which can undergo living polymerization, as described above. For example, the vinyl groups of styrene, a-methyl styrene, and alkyl methacrylate are living polymerization sites, because they can undergo living anionic polymerization.

As used herein, a polymerization initiation site is a group in a compound which can induce (or initiate) the polymerization of a monomer. For example, the carbanion of 1,1-diphenylhexyllithium is an initiation site, which can induce the (living) anionic polymerization of alkyl methacrylate.

As used herein, a graft copolymer contains a backbone polymer, to which side chains are attached. The backbone polymer can be a homopolymer or a random copolymer and the side chains can also be a homopolymer or a random copolymer.

As used herein, a graft-block copolymer contains a backbone polymer, to which side chains are attached. The backbone polymer can be a homopolymer or a random copolymer and the side chains are block copolymers.

As used herein, a block-graft copolymer contains a block copolymer as the backbone and side chains are attached to one block of the backbone. The backbone must be a block copolymer and the side chains are generally homopolymers.

As used herein, a star-shaped copolymer is a copolymer in which several ($\geq 3$) polymer arms are connected to a single point. If the arms are the same kind of polymer, it is called a star-shaped polymer. If the arms are different kinds of polymers, it is called a star-shaped copolymer.

The present invention relates to a continuous method of preparing a block-graft or star-shaped copolymer. This method involves providing a living polymer, mixing the living polymer with a first monomer under conditions effective to produce a block copolymer, wherein the first monomer comprises a living polymerization site and a living polymerization initiation site, and mixing the block copolymer with a second monomer under conditions effective to produce a block-graft or star-shaped copolymer.

Figure 1A:
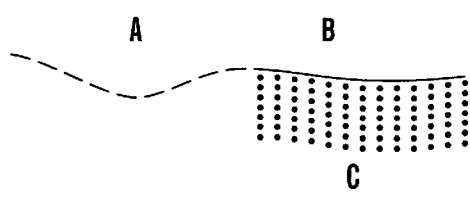
FIGS. 1A and B show a schematic representation of the molecular architecture of two model copolymers prepared by the methods of the present invention.
Figure 1B:
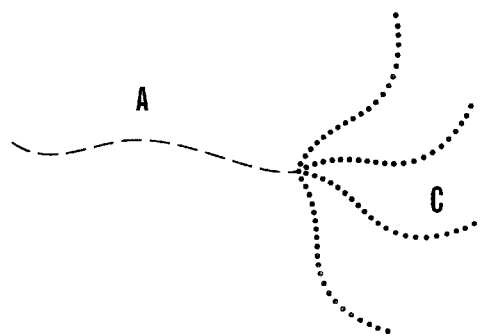
FIG. 1B shows a star-shaped copolymer consisting of only one A arm and several C arms.

As shown in FIG. 1A, a block-graft copolymer comprises an AB block backbone and C side chains attached to one of the blocks of the backbone, where A represents the living polymer, B represents the first monomer, and C represents the second monomer. As shown in FIG. 1B, a star-shaped copolymer comprises one A arm and several C arms.

Suitable living polymers have the following formula

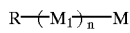

where $M_1$ is styrene, α-methyl styrene, butadiene, isoprene, methyl methacrylate, ethyl methacrylate, butyl methacrylate, or tert-butyl methacrylate and n is an integer. Thus, such suitable living polymers include polystyrene, poly(α-methyl styrene), polybutadiene, polyisoprene, and the living polymers of alkyl (meth)acrylate monomers, such as poly(methyl methacrylate), poly(ethyl methacrylate), poly(butyl methacrylate), poly(tert-butyl methacrylate), and the like.

Preferably, the living polymer is living poly(methyl methacrylate) ("poly(MMA)"), having the formula below:

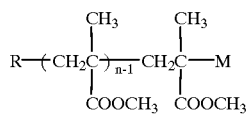

Living polymers can be provided by methods known to those of ordinary skill in the art. For example, living poly(MMA) can be provided by anionic polymerizing methyl methacrylate ("MMA"). In particular, MMA is anionic polymerized by mixing MMA with an initiator, e.g., (1,1-diphenylhexyl)lithium ("DPHL"), in tetrahydrofuran ("THF") at −60° C. In addition, other additives may be present in the mixture. For example, LiCl is often used as an additive in the anionic polymerization of the acrylic monomers (Aoshima et al., *Polym. Bull.* 13:229 et seq. (1985); Norhay et al., *Block Copolymers*, Academic: New York (1977); Fayt et al., *Macromolecules* 20:1442 et seq. (1987), which are hereby incorporated by reference), because the formation of a μ-type complex between LiCl and the propagating site prevents the occurrence of side reactions. Thus, a polymer with well-defined molecular architecture and narrow molecular weight distribution can be obtained.

The method of the present involves the use of special compounds (i.e., first monomers) which are dormant initiators for living polymerization. Such compounds are both a monomer for living polymerization and a dormant initiator for living polymerization. In particular, such monomers include an anionic polymerization site and a cationic polymerization initiation site, or a cationic polymerization site and an anionic polymerization initiation site.

Suitable first monomers which possess an anionic polymerization site include styrene, α-methyl styrene, butadiene, isoprene, MMA, ethyl methacrylate, butyl methacrylate, tert-butyl methacrylate, methyl crotonate, butyl crotonate, tert-butyl crotonate, ethylene oxide, and propylene oxide. Suitable reagents which possess a cationic polymerization initiation site include hydrogen iodide, sulfuric acid, boron trifluoride, acetoxyethyl ethyl ether, acetoxyethyl butyl ether, acetoxyethyl isobutyl ether, and acetoxyethyl tert-butyl ether.

Suitable monomers which possess a cationic polymerization site include, methyl vinyl ether, ethyl vinyl ether, butyl vinyl ether, tert-butyl vinyl ether, 2-chloroethyl vinyl ether, 2-acetoxyethyl vinyl ether, 2-methacryloyloxyethyl vinyl ether, ethylene glycol vinyl ether, di(ethylene glycol) vinyl ether, tri(ethylene glycol), vinyl ether, p-methoxystyrene, p-tert-butoxystyrene, and isobutene. Suitable reagents which possess anionic polymerization initiation sites include n-butyllithium, sec-butyllithium, tert-butyllithium, sodium napthalenide, lithium napthalenide, 1,1-diphenylhexyllithium, phenyl magnesium chloride, tert-butyl magnesium chloride, isobutyl magnesium chloride, and dimethyl phenyl methyl potassium.

Thus, suitable first monomers include 2-(1-acetoxyethoxy)ethyl methacrylate (AEEMA), (trifluoroacetoxyethoxy)ethyl methacrylate, (chloroacetoxyethoxy)ethyl methacrylate, and (dichloroacetoxy)ethyl methacrylate. Most preferred is 2-(1-acetoxyethoxy)ethyl methacrylate (AEEMA). Because of the presence of the electron-deficient C=C double bond in the methacryloyl group, AEEMA can be subjected to anionic polymerization. Alternatively, in the presence of a Lewis acid, such as $ZnCl_2$ or $EtAlCl_2$, the linkage between the acetoxy and ethoxy groups of AEEMA can be activated to generate a partly dissociated carbocation, which can induce the cationic polymerization of a second monomer. In a basic environment, this linkage is stable enough to allow the anionic polymerization of AEEMA to proceed.

In a preferred embodiment, the living polymer is poly (MMA) and the first monomer is AEEMA, to produce a block copolymer of the following formula:

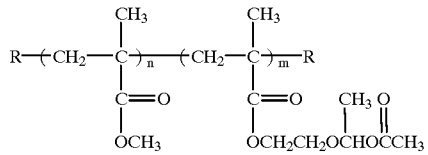

Suitable second monomers include isobutyl vinyl ether ("IBVE"), methyl vinyl ether, ethyl vinyl ether, butyl vinyl ether, ter-butyl vinyl ether, p-methoxystyrene, and p-tert-butoxystyrene.

Mixing of the living polymer solution with a first monomer under conditions effective to produce a block copolymer (block macroinitiator) can be carried out by conventional mixing techniques, such as stirring, rocking, kneading, and the like. In some cases, especially where the living polymer and/or the first monomer are not liquids, the mixing can be effected by dissolving either or both in a suitable solvent. Suitable solvents for anionic polymerization include THF, 1,4-dioxane, 1,3-dioxane, benzene, toluene, xylene, hexane, heptane, and cyclohexane. Suitable solvents for cationic polymerization include dichloromethane, chloroform, carbon tetrachloride, hexane, toluene, octane, cyclohexane, and benzene.

The polymerizations of the present invention can be carried out by standard polymerization methods. Generally, the living polymer or block copolymer is mixed with a suitable polymerization initiator, and the living polymer or block copolymer is exposed to conditions sufficient to initiate polymerization. The living polymer or block copolymer is then maintained under conditions sufficient to sustain polymerization of the living polymer or block copolymer for a period of time sufficient to achieve the degree of polymerization desired. Typically, the degree of polymerization which has occurred is monitored by measuring the viscosity of the mixture at various intervals.

The anionic polymerization technique is most suitable for synthesis of block copolymers, since it provides a controlled molecular weight and composition, narrow molecular weight distribution, and well-defined chain structure (Norhay et al., *Block Copolymers*, Academic: New York (1977), which is hereby incorporated by reference).

Suitable initiators are well known in the art. For example, the initiator can be 1,1-diphenylhexyllithium, n-butyllithium, phenyl magnesium-chloride, and the anionic living oligomer of styrene or α-methyl styrene.

Other additives which are known to those of ordinary skill in the art may be present in the polymerization mixture. For example, LiCl is often used as an additive in the anionic polymerization of the acrylic monomers (Fayt et al., *Macromolecules* 20:1442 et seq. (1987), which is hereby incorporated by reference), as described above. In addition, an activator may be present in the polymerization mixture. Suitable activators for cationic polymerization include weak acids, such as Lewis acids. Preferred Lewis acids include $AlCl_3$, $Et_2AlCl$, $Et_2AlCl$, $Et_3Al$, $ZnCl_2$, $ZnBr_2$, $ZnI_2$, $SnCl_2$, $SnCl_4$, $SnBr_4$, and $I_2$. Most preferred is $EtAlCl_2$.

In the above method of the present invention, no termination, polymer separation, and purification are needed after the preparation of the block copolymer. Thus, the block-graft and star-shaped copolymers can be prepared by the continuous addition of monomers, solvent, and additives, and the operation can be performed easily and is suitable for industrial production.

When the desired block-graft or star-shaped copolymer is produced according to the present invention, the polymerization reaction of the block copolymer with the second monomer may be terminated by methods known to those of ordinary skill in the art, such as by administration of an aqueous solution of ammonia. Then the quenched reaction mixture may be washed (e.g., with dilute HCl and water), evaporated to dryness (e.g., under reduced pressure), and vacuum-dried to obtain the copolymer.

The method of the present invention produces well-defined block-graft copolymers with the following characteristics: (1) the molecular weights of the backbone and side chains, hence the total molecular weight of the block-graft copolymer, can be controlled; (2) the side chains are located only in one part of the backbone, and their number can be selected; and (3) both the backbone and the side chains possess narrow molecular weight distributions.

Figure 2:
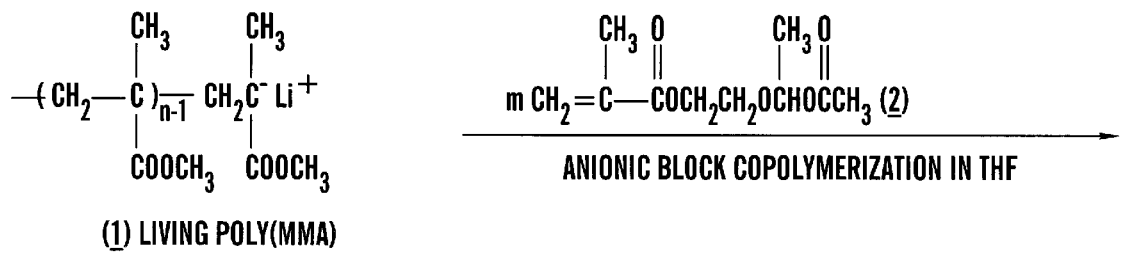
FIG. 2 shows the preparation of a block-graft copolymer by a continuous three-step route.
Figure 2:
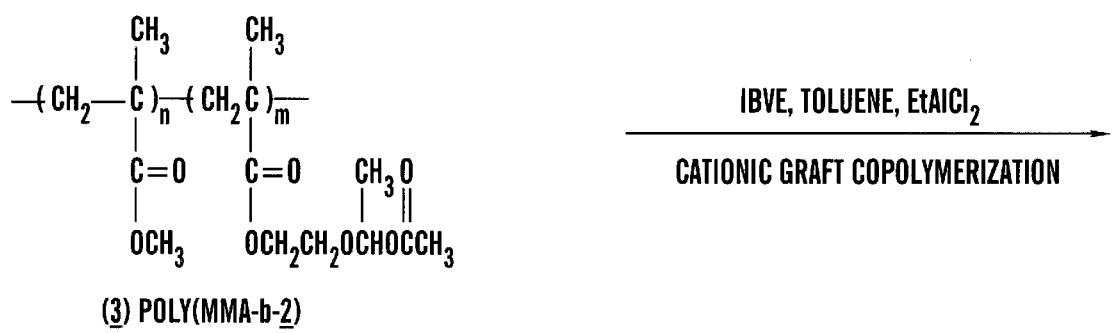
Figure 2:
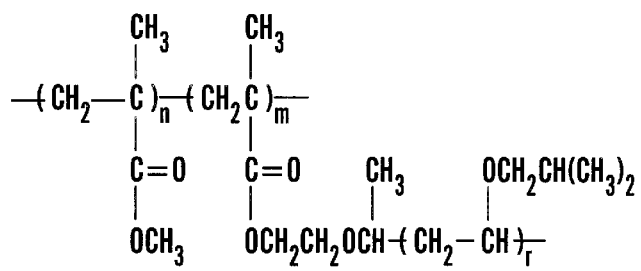

Since the steps of the above method of the present invention take place in a living manner, the polymerization degree in every step can be controlled by the amount of added monomer. When the polymerization degrees of the living polymer (e.g., poly(MMA)) and the second monomer (e.g., IBVE) (n and r; see 4 in FIG. 2) are large and that of the first monomer (e.g., AEEMA) (m) is small, the poly (AEEMA) segment is very short and a star-shaped copolymer can be obtained, which contains one poly(MMA) arm and several poly(IBVE) arms (FIG. 1B). For instance, if the polymerization degree of AEEMA is restricted to four (m=4), the star-shaped copolymer will have five arms (1+m): one poly(MMA) arm and four poly-(IBVE) arms. As for the block-graft copolymers, the arm number and the molecular weights of both the poly(MMA) arm and the poly(IBVE) arms are controllable and the star-shaped copolymer possesses a narrow molecular weight distribution.

The copolymers produced by the methods of the present invention may include both polar and nonpolar segments. Such copolymers may be useful in the preparation of compatibilizers for polymer blends, membranes for separation of gases or liquids, drug deliverers, and thermoplastic elastomers.

The present invention also relates to a block-graft or star-shaped copolymer having the formula:

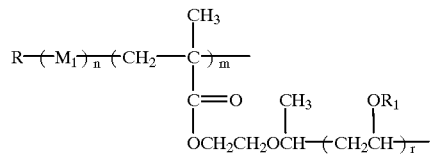

wherein n is an integer, m is an integer, r is an integer, and n, m, and r are a predetermined polymerization degree, R an alkyl, $R_1$ is selected from the group consisting of an alkyl, such as methyl, ethyl, butyl, isobutyl, and tert-butyl, 2-chloroethyl, 2-acetoxyethyl, and 2-methacryloyloxyethyl, and $M_1$ is selected from the group consisting of styrene, α-methyl styrene, butadiene, isoprene, methyl methacrylate, ethyl methacrylate, butyl methacrylate, and tert-butyl methacrylate.

Preferably, n is 10 to 1000, m is 10 to 1000, and r is 10 to 1000.

In a preferred embodiment R is 1,1-diphenylhexyl, 2-methylstyryl, phenyl, n-butyl, or tert-butyl and $R_1$ is isobutyl.

Another aspect of the present invention is a continuous method of preparing a graft copolymer. This method involves mixing a first monomer and a second monomer under conditions effective to produce a copolymer of the first and second monomers, wherein the first monomer comprises a polymerization site and a polymerization initiation site, and mixing the copolymer with a third monomer under conditions effective to produce a graft copolymer.

Suitable first monomers are described above. Most preferred is AEEMA.

Suitable second monomers include methyl methacrylate ("MMA"), ethyl methacrylate, propyl methacrylate, isopropyl methacrylate, butyl methacrylate, and tert-butyl methacrylate.

Mixing of the first and second monomers generates a backbone copolymer (e.g., poly(MMA-co-AEEMA)) with a controlled molecular weight and a narrow MWD.

In a preferred embodiment, the copolymer is a poly (MMA-co-AEEMA) backbone having the formula:

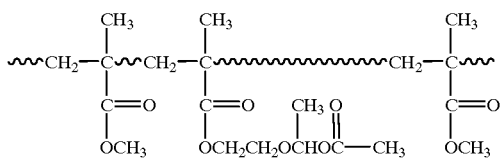

The linkage between the acetoxy and the ethoxy groups of an AEEMA unit in poly(MMA-co-AEEMA), activated by a Lewis acid, e.g., $EtAlCl_2$, can induce the cationic graft copolymerization of the third monomer.

In a preferred embodiment, the third monomer is a functional monomer. Suitable functional third monomers include isobutyl vinyl ether, 2-acetoxyethyl vinyl ether, 2-chloroethyl vinyl ether, 2-vinyloxyethyl methacrylate, 2-methacryloyloxyethyl vinyl ether, protected ethylene glycol vinyl ether, protected di(ethylene glycol) vinyl ether, protected tri(ethylene glycol) vinyl ether, protected 1,4-butanediol vinyl ether, protected 1,6-hexanediol vinyl ether, and mixtures thereof.

Suitable non-functional third monomers include methyl vinyl ether, ethyl vinyl ether, butyl vinyl ether, tert-butyl vinyl ether, p-methoxystyrene, p-tert-butoxystyrene, and mixtures thereof.

According to the above method of the present invention, a well-defined graft copolymer with functional side chains may be obtained. As used herein, a well-defined graft copolymer means that: (1) the molecular weights of the backbone and side chains can be controlled; (2) the molecular architecture can be designed; (3) both the backbone and the side chains have narrow molecular weight distributions ("MWD"); and (4) the graft copolymer possesses high purity, free of its precursor polymers.

Further, instead of a single functional monomer, the simultaneous addition of a non-functional third monomer and a functional third monomer can be used to prepare a graft copolymer with random copolymer side chains.

The above method of the present invention allows the production of a graft copolymer without quenching and polymer separation after mixing the first and second monomers. Preferably, depending on the third monomer employed, the side chain can contain an acetoxy, chloroalkyl, or C=C double bond of methacryloyl group in every repeating unit.

Yet another aspect of the present invention is a graft copolymer having the formula:

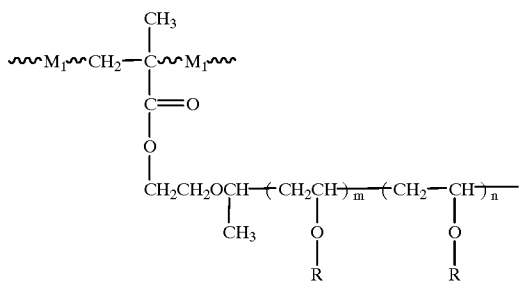

where m is an integer, n is an integer ≧0, R is the same or different and is selected from the group consisting of an alkyl, such as isobutyl, butyl, ethyl, and methyl, acetoxyethyl, chloroethyl, and methacryloyloxyethyl, and $M_1$ is selected from the group consisting of methyl methacrylate, ethyl methacrylate, propyl methacrylate, isopropyl methacrylate, butyl methacrylate, and tert-butyl methacrylate.

The present invention further relates to a continuous method of preparing a graft-block copolymer. This method involves mixing a first monomer and a second monomer under conditions effective to produce a copolymer of the first and second monomers, wherein the first monomer comprises a living polymerization site and a living polymerization initiation site, mixing the copolymer with a third monomer under conditions effective to produce a graft copolymer, and mixing the graft copolymer with a fourth monomer under conditions effective to produce a graft-block copolymer.

Suitable fourth monomers include those described above as suitable third monomers.

Another aspect of the present invention is a graft-block copolymer having the formula:

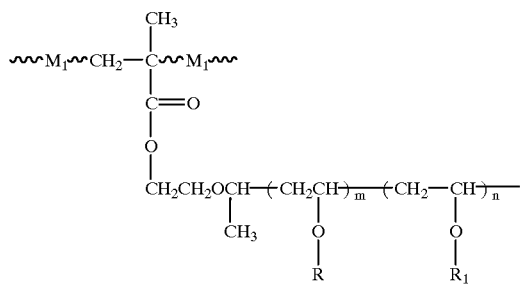

where m is an integer, n is an integer, R is the same or different and is selected from the group consisting of an alkyl, such as isobutyl, butyl, ethyl, and methyl, acetoxyethyl, chloroethyl, and methacryloyloxyethyl, $R_1$ is the same or different and is selected from the group consisting of an alkyl, such as isobutyl, butyl, ethyl, and methyl, acetoxyethyl, chloroethyl, and methacryloyloxyethyl, and $M_1$ is selected from the group consisting of methyl methacrylate, ethyl methacrylate, propyl methacrylate, isopropyl methacrylate, butyl methacrylate, and tert-butyl methacrylate.

EXAMPLES

Example 1

Materials for Preparation of Graft, Block-Graft, and Star-Shaped Copolymers

Tetrahydrofuran ("THF") was dried with $CaH_2$ under reflux for more than 24 hours, distilled, purified in the presence of naphthalene sodium, and finally distilled from a solution of (1,1-diphenylhexyl)lithium ("DPHL") just before use. Toluene was washed with concentrated sulfuric acid and then with water, dried over $MgSO_4$, and distilled twice over $CaH_2$ before use. Hexane was first dried and distilled over $CaH_2$ and then distilled from a solution of n-BuLi. Methyl methacrylate ("MMA") and isobutyl vinyl ether ("IBVE"; Aldrich, 99%) were washed with 10% aqueous sodium hydroxide solution and then with water, dried overnight with $MgSO_4$ and potassium hydroxide, respectively, and distilled twice over $CaH_2$ prior to polymerization (Aoshima et al., *Macromolecules* 22:1009 et seq. (1989); Kamigaito et al., *Macromolecules* 24:3988 et seq. (1991), which are hereby incorporated by reference). 1,1-Diphenylethylene ("DPE"; Aldrich, 97%) was doubly distilled over $CaH_2$ and then distilled in the presence of (triphenylmethyl)lithium under reduced pressure (Zhang et al., *J. Polym. Sci., Polym. Chem.* 35:2901 et seq. (1997), which is hereby incorporated by reference). Lithium chloride (Aldrich, 99.99%) was dried at 120° C. for 24 hours and dissolved in THF (Varshney et al., *Macromolecules* 23:2618 et seq. (1990), which is hereby incorporated by reference). n-BuLi (Aldrich, 1.6 M solution in hexane) and $EtAlCl_2$ (Aldrich, 1.8 M solution in toluene) were diluted with purified hexane and toluene, respectively.

Example 2

Syntheses of 2-(Vinyloxy)ethyl Methacrylate ("VEMA") and 2-(1-Acetoxyethoxy)ethyl Methacrylate ("AEEMA")

Figure 3A:
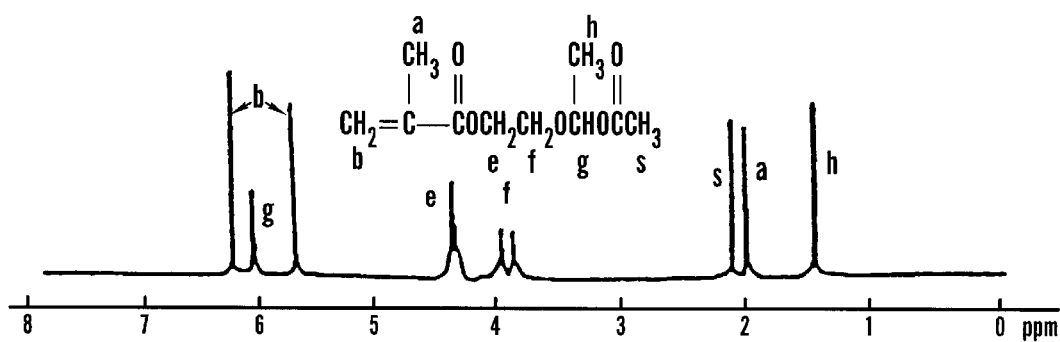
FIGS. 3A–C show $^1$H NMR spectra of AEEMA (FIG. 3A), block-graft copolymer (FIG. 31B, BCP-1 in Table 2, see the molecular structure in FIG. 3C), and star-shaped copolymer (FIG. 3C, SP-1 in Table 3).

VEMA was prepared through the reaction between 2-chloroethyl vinyl ether (Aldrich, 99%) and sodium methacrylate (Aldrich, 99%) under reflux with stirring, in the presence of small amounts of a phase-transfer catalyst (tetrabutylammonium iodide) and an inhibitor (4-tert-butylcatechol) (Aoshima et al., *Polym. Bull.* 13:229 et seq. (1985), which is hereby incorporated by reference). AEEMA was synthesized by the addition reaction between VEMA and acetic acid. In a 100 ml round-bottom flask equipped with a condenser and a magnetic stirrer, 21.0 g (0.14 mol) of VEMA and a small amount of 4-tert-butylcatechol were introduced under the protection of nitrogen. After 4-tert-butylcatechol dissolved and the temperature was raised to 70° C., acetic acid (8.1 g, 0.14 mol; Aldrich, 99.8%) was added dropwise with a syringe. The reaction was allowed to last 5 hours at 70° C., and the crude product was distilled under reduced pressure (hp 65–66° C./1.0 Torr; yield 86%). Prior to polymerization, the monomer was doubly distilled over $CaH_2$. As shown in FIG. 3A, the chemical shifts and their intensities in the $^1H$ NMR spectrum of the prepared AEEMA are consistent with its molecular structure.

Example 3

Preparation of the Block Macroinitiator by the An ionic Block Copolymerization of MMA and AEEMA All polymerizations were carried out in a 100-ml round-bottom glass flask under an overpressure of nitrogen with magnetic stirring. The anionic block copolymerization of MMA and AEEMA was performed in THF at –60° C. in the presence of LiCl ([LiCl]/[DPHL]$_o$=4). After THF, DPE, and a THF solution of LiCl were added with dry syringes, the flask was cooled to –40° C. and n-BuLi (in hexane) was introduced. The deep red color of DPHL appeared at once, and the reaction between n-BuLi and DPE was allowed to continue for 15 minutes. Then, the system was cooled to –60° C. and the polymerization reaction was induced by the addition of a prechilled THF solution of MMA. After 30 minutes, the prechilled AEEMA was sequentially added and the block copolymerization was allowed to last 90 minutes. Without polymer separation, this THF solution was directly used in the next step for the preparation of block-graft or star-shaped copolymers.

Example 4

Synthesis of Block-Graft or Star-Shaped Copolymers by the Cationic Polymerization of IBVE to the Block Macroinitiator After the anionic block copolymerization of MMA and AEEMA, purified toluene and IBVE were continuously added to the THF solution of poly(MMA-b-AEEMA). After the temperature was raised to 25° C., a toluene solution of $EtAlCl_2$ was introduced to start the graft copolymerization and the reaction was allowed to last 4 hours. Then, the polymerization was terminated with an aqueous solution of ammonia. The quenched reaction mixture was washed with dilute hydrochloric acid and then with water, evaporated to dryness under reduced pressure, and vacuum-dried to obtain the polymer.

Example 5

Measurements $^1H$ NMR spectra were recorded in $CDCl_3$ or $CD_3OD$ on a VXR-400 spectrometer. $M_n$ and $M_w/M_n$ of the polymer were determined by gel permeation chromatography ("GPC") on the basis of a polystyrene calibration curve. The GPC measurements were carried out using TUF as the solvent, at 30° C., with a 1.0 ml/min. flow rate and a 1.0 cm/min. chart speed. Three polystyrene gel columns (Waters, 7.8×300 mm; two Linear, Part No. 10681, and one HR 4E, Part No. 44240) were used, which were connected to a Waters 515 precision pump.

Example 6

Preparation of the Block Macroinitiator by the Anionic Block Copolymerization of MMA and AEEMA The anionic polymerization technique is most suitable for the synthesis of block copolymers, since it provides a controlled molecular weight and composition, narrow molecular weight distribution, and well-defined chain structure (Norhay et al., *Block Copolymers* Academic: New York (1977), which is hereby incorporated by reference). The backbone of the block-graft copolymer prepared in the Examples above is an AB-type block copolymer consisting of poly(MMA) and poly(AEEMA) segments, which was prepared by the sequential anionic polymerization of MMA and AEEMA.

LiCl is often used as an additive in the anionic polymerization of the acrylic monomers (Fayt et al., *Macromolecules* 20:1442 et seq. (1987); Varshney et al., *Macromolecules* 25:4457 et seq. (1992); Kunkel et al., *Makromol. Chem. Macromol. Symp.* 60:315 et seq. (1992), which is hereby incorporated by reference), because the formation of a $\mu$-type complex between LiCl and the propagating site prevents the occurrence of side reactions. A polymer with a well-defined molecular architecture and narrow molecular weight distribution can thus be obtained. Both MMA and AEEMA used for the preparation of the backbone of the block-graft copolymer belong to the acrylic monomers. LiCl was, therefore, employed to prepare a well-defined block macroinitiator.

The initiator, DPHL, was prepared via the reaction of n-BuLi with DPE in the ratio DPE [DPE]/n-BuLi]$_0$=1.2 (Table 1), at –49° C., for 15 minutes. The anionic block copolymerization was carried out in THF at –60° C. in the presence of LiCl ([LiCL]/[n-BuLi]$_0$=4) by the sequential polymerization of MMA and AEEMA.

TABLE 1

Preparation of the Block Macroinitiator (BMI) by the Anionic Block Copolymerization of MMA and AEEMA[a]

| no. | [n-Buli]$_0$, mM | [MMA]$_0$, M | [2]$_0$, M | $10^{-3} M_n$ Calcd | $10^{-3} M_n$ obsd[b] | $M_w/M_n$[b] | n/m[c] |
|---|---|---|---|---|---|---|---|
| BMI-1 | 28 | 0.67 | 0.31 | 5.04 | 4.86 | 1.07 | 23.1/10.7 |
| BMI-2 | 19 | 0.67 | 0.31 | 7.39 | 7.77 | 1.05 | 37.7/17.4 |
| BMI-3 | 14 | 0.78 | 0.36 | 11.30 | 12.50 | 1.13 | 61.3/28.4 |

TABLE 1-continued

Preparation of the Block Macroinitiator (BMI) by the Anionic Block Copolymerization of MMA and AEEMA[a]

| no. | [n-BuLi]$_0$ mM | [MMA]$_0$, M | [2]$_0$, M | 10$^{-3}$ M$_n$ Calcd | obsd[b] | M$_w$/M$_n$[b] | n/m[c] |
|---|---|---|---|---|---|---|---|
| BMI-4 | 26 | 0.60 | 0.093 | 3.27 | 3.21 | 1.07 | 22.3/3.4 |
| BMI-5 | 17 | 0.67 | 0.083 | 5.23 | 5.46 | 1.06 | 41.1/5.1 |

[a]The initiator DPHL was first prepared by the raction of n-BuLi with DPE ([DPE]/[n-BuLi]$_0$ = 1.2) at −40° C. for 15 minutes. The block copolymerization was carried out in THF at −60° C. in the presence of LiCl ([LiCl]/[DPHL]$_0$ = 4). The polymerization times were 30 and 90 minutes for MMA and AEEMA, respectively. The yields of the block copolymers were quantitative in all cases.
[b]Determined by GPC.
[c]n and m: polymerization degrees of MMA (molecular weight: 100) and AEEMA (molecular weight: 216) in the block copolymer, respectively. The polymerization degree of MMA (n) an AEEMA (m) were calculated as follows: n = [(M$_{n(block)}$ − M$_{initiator}$) W$_{MMA}$/(W$_{AEEMA}$ + W$_{MMA}$)/M$_{MMA}$ and m = [(M$_{n(block)}$ − M$_{initiator}$) W$_{AEEMA}$/(W$_{AEEMA}$ + W$_{MMA}$)]/M$_{AEEMA}$) where M$_{n(block)}$ is the molecular weight of the block copolymer, poly(MMA-b-AEEMA), determined by GPC; M$_{initiator}$ is the molecular weight of the initiator moiety (1,1-diphenyl-hexyl); W$_{MMA}$ and W$_{AEEMA}$ are the weight of the monomer, MMA and AEEMA, respectively; and M$_{MMA}$ and M$_{AEEMA}$ are the molecular weights of the two monomers, MMA and AEEMA, respectively. The molecular weight (M$_k$) of each poly(IBVE) side chain (or arm) was calculated as follows: M$_k$ = M$_{IBVE}$ ([IBVE]$_0$/[I]$_0$), where M$_{IBVE}$ is the monomer molecular weight of IBVE, [IBVE]$_0$ is the initial concentration of IBVE, and [I]$_0$ is the concentration of the repeating unit of AEEMA in the block macroinitiator, poly(MMA-b-AEEMA). The total molecular weight of the block-graft or star-shaped copolymer was calculated as follows: M$_n$ = M$_{n(block)}$ + mM$_k$ − 59m + 17m = M$_{n(block)}$ + m(M$_k$ − 42). After the cationic graft copolymerization of IBVE, the acetoxy group ($^-$OCOCH$_3$, molecular weight = 59) at each end of the side chain (or arm end) was replaced by a hydroxyl group (OH$^-$, molecular weight = 17).

Figure 4:
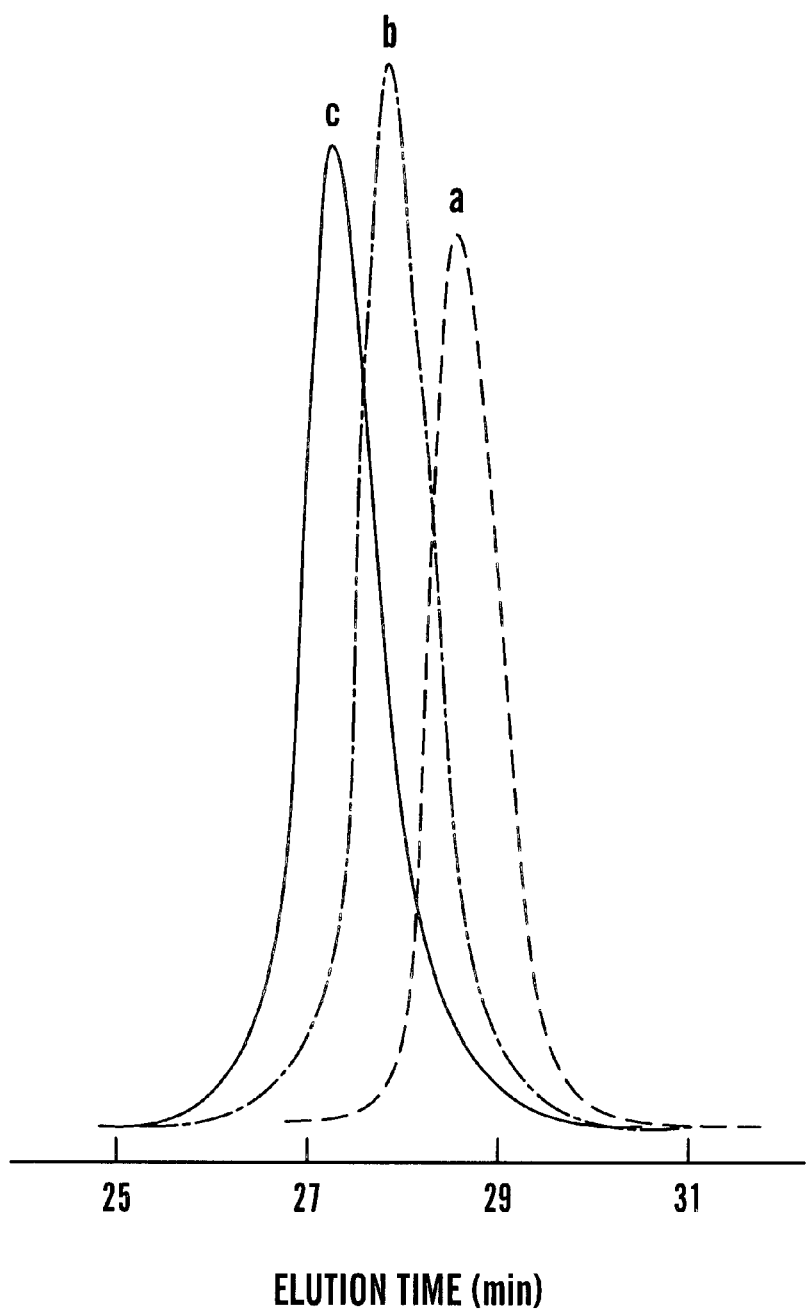
FIG. 4 shows gas permeation chromatography ("GPC") traces for the continuous synthesis of a block-graft copolymer. Peak a is living poly methyl methacrylate ("poly (MMA)") ($M_n$=2640, $M_w/M_n$=1.09) prepared by the anionic polymerization of methyl methacrylate. Peak b is block macroinitiator (poly(MMA-b-AEEMA), BMI-1 in Table 1, $M_n$=4860, $M_w/M_n$=1.07) prepared by the anionic block copolymerization of 2-(1-acetoxyethoxy)ethyl methacrylate ("AEEMA") starting with the above living poly(MMA). Peak c is the block-graft copolymer (BGP-1 in Table 2, $M_n$=6500, $M_w/M_n$=1.12) prepared in the last step by the cationic graft copolymerization of isobutyl vinyl ether ("IBVE") to the above block macroinitiator.

As shown in Table 1, the calculated number-average molecular weight of the block copolymer was close to the determined value and the molecular weight distribution was very narrow (M$_w$/M$_n$=1.05–1.13). FIG. 4 shows that the GPC peak (Peak a) of the living poly(MMA) precursor (M$_n$=2640, M$_w$/M$_n$=1.09) shifted toward a higher molecular weight (b) after the polymerization of AEEMA, because of the formation of the diblock copolymer, poly(MMA-b-AEEMA) (BMI-1 in Table 1, M$_n$=4860). In addition, no peak for the poly(MMA) precursor was present and the molecular weight distribution of the block copolymer was narrow (M$_w$/M$_n$=1.07). This indicates that all the living sites of poly(MMA) were consumed in initiating the polymerization of AEEMA and that the transformation of the anionic living site from poly(MMA) to poly(AEEMA) was faster than the propagation rate of AEEMA. For BMI-1, BMI-2, and BMI-3 (Table 1), the molecular weight of the poly (MMA) segment was almost equal to that of the poly (AEEMA) segment. However, the total molecular weight of the block copolymer increased as the ratio ([MMA]$_0$+ [AEEMA]$_0$)/[n-BuLi]$_0$ becomes larger. Therefore, the polymerization degrees (m) of AEEMA were different. Those block copolymers were used as macroinitiators in the syntheses of the block-graft copolymers with various numbers of side chains. Compared to the above block copolymers, the polymerization degrees of AEEMA in BMI-4 and BMI-5 (Table 1) were small (m=3.4 and 5.1, respectively). These block copolymers were used as macroinitiators for the syntheses of the star-shaped copolymers.

Example 7

Synthesis of the Block-Graft Copolymer by Cationic Graft Copolymerization of IBVE to the Block Macroinitiator The living cationic polymerization of a number of vinyl monomers, such as alkyl vinyl ether, isobutylene, and styrene-type monomers, was carried out by a number of researchers (Sawamoto et al., *Prog. Polym. Sci.* 16:111 et seq. (1991); Majoros et al., *Adv. Polym. Sci.* 112:1 et seq. (1994); Fodor et al., *J. Macromol. Sci., Pure Appl. Chem.* A32:575 et seq. (1995); Higashimura et al., *Macromolecules* 26:744 et seq. (1993); Aoshima et al., *Macromolecules* 22:1009 et seq. (1989); Kishimoto et al., *Macromolecules* 22:3877 et seq. (1989), which are hereby incorporated by reference). Kamigaito et al., (Kamigaito et al., *Macromolecules* 24:3988 et seq. (1991), which is hereby incorporated by reference), found that 1-(isobutoxy)ethyl acetate ("IBEA") can be used as an initiator for the cationic polymerization of alkyl vinyl ether in the presence of a Lewis acid. The linkage between the acetoxy group and ethoxy group can be activated by the Lewis acid to generate a partly dissociated carbocation, which induces the cationic polymerization of alkyl vinyl ether. However, when a very strong Lewis acid, EtAlCl$_2$, was used, the cationic polymerization could not be controlled. In the latter case, the molecular weight distribution of the obtained polymer was broad, because the counteranion ($^-$OCOCH$_3$ ... EtAlCl$_2$) possesses a too weak nucleophilicity. However, when a weak Lewis base, such as THF, 1,4-dioxane, or ethyl acetate, was introduced into the above system, a living cationic polymerization could be achieved (Aoshima et al., *Macromolecules* 22:1009 et seq. (1989); Kishimoto et al., *Macromolecules* 22:3877 et seq. (1989), which is hereby incorporated by reference). In this case, the propagating site was suitably stabilized by the added Lewis base.

Every side chain of the poly(AEEMA) segment in the poly-(MMA-b-AEEMA) prepared above has a molecular structure (3, in FIG. 2) similar to that of the initiator, IBEA. In the presence of a Lewis acid, EtAlCl$_2$, every side chain of the poly(AEEMA) segment became an initiating site for the cationic polymerization of IBVE. In addition, the THF, which was used as the solvent in the polymerization steps for the preparation of the block macroinitiator, acted as a Lewis base in the last polymerization step for the synthesis of the block-graft copolymer. These conditions provided the possibility of preparing a block-graft copolymer by a continuous synthetic route.

After the anionic block copolymerization of MMA and AEEMA, the prepared block macroinitiator, poly(MMA-b-AEEMA), was not separated from its THF solution, to which purified toluene and IBVE were added. After the system acquired the room temperature (25° C.), EtAlCl$_2$ (in toluene) was added to induce the cationic graft copolymerization of IBVE and the reaction was allowed to last 4 hours (Table 2).

However, the molecular weight of BGP-4 ($M_n=2.11\times10^4$) is obviously larger than that of BGP-2 ($M_n=1.30\times10^4$).

Figure 5:
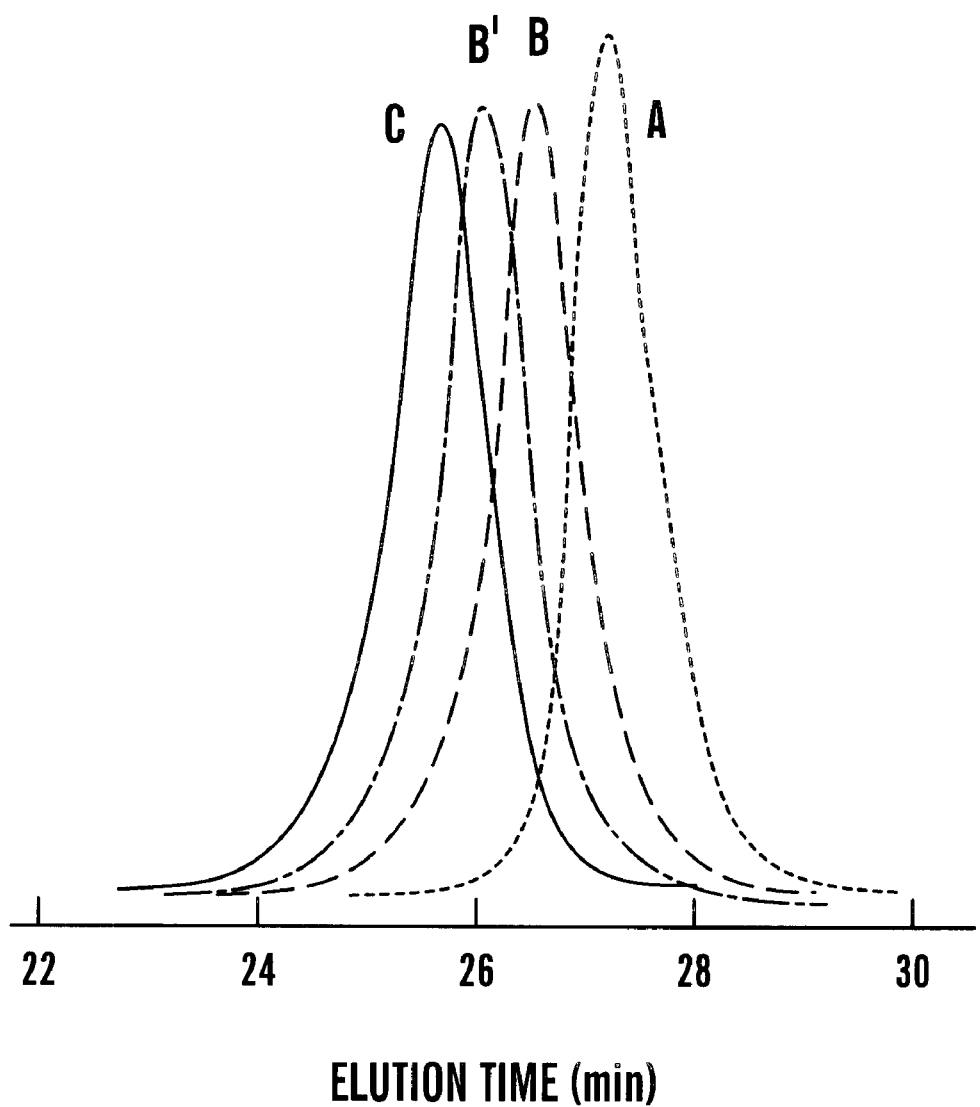
FIG. 5 shows GPC traces for the molecular control of the block-graft copolymers. Peak a is the block macroinitiator (poly(MMA-b-AEEMA), BMI-2 in Table 1, $M_n=7770$, $M_w/M_n=1.05$) prepared by the anionic block copolymerization of MMA and AEEMA. Peak b is the block-graft copolymer (BGP-2 in Table 2, $M_n=1.30\times10^4$, $M_w/M_n=1.12$) prepared by the cationic graft copolymerization of IBVE to the above block macroinitiator (BMI-2) using a ratio of $[IBVE]_0/[I]_0=3.33$. Peak b' is BGP-3 (Table 2, $M_n=1.81\times10^4$ $M_w/M_n=1.11$) prepared by adding the same amount of IBVE to the above complete polymerization system of Peak b. Peak c is BGP-4 (Table 2, $M_n=2.11\times10^4$, $M_w/M_n=1.14$). The amount of IBVE was 3 times as large as that of Peak b ($[IBVE]_0/[I]_0=10$).

The living characteristic of the cationic graft copolymerization of IBVE to the block macroinitiator was confirmed by a two times monomer addition experiment. After the cationic polymerization of IBVE during the preparation of BGP-2 had proceeded for 2 hours, an equal amount of fresh IBVE was added and the polymerization was allowed to last an additional 2 hours. As shown in FIG. 5, a new peak (Peak b'; BGP-3 in Table 2, $M_n=1.81\times10^4$) between Peaks b (BGP-2) and c (BGP-4) appeared. However, its molecular weight distribution ($M_w/M_n=1.11$) was as narrow as those of

TABLE 2

Synthesis of the Block-Graft Copolymer (BGP) by Cationic Graft Copolymerization of IBVE to the Block Macroinitiator[a]

| No. | Macroinitiator[b] | $[I]_o^c$, mM | $[IBVE]_{o1}$ M | $N^d$ | $M_k^e$ | $10^{-4} M_{n(graft)}$ calcd[f] | obsd[g] | $M_w/M_n^g$ |
|---|---|---|---|---|---|---|---|---|
| BGP-1 | BMI-1 | 147 | 0.32 | 10.7 | 218 | 0.67 | 0.65 | 1.12 |
| BGP-2 | BMI-2 | 84 | 0.28 | 17.4 | 333 | 1.28 | 1.30 | 1.12 |
| BGP-3 | BMI-2 | 81 | 0.54 | 17.4 | 667 | 1.86 | 1.81 | 1.11 |
| BGP-4 | BMI-2 | 84 | 0.84 | 17.4 | 1000 | 2.44 | 2.11 | 1.14 |
| BGP-5 | BMI-3 | 138 | 0.60 | 28.4 | 435 | 2.37 | 1.88 | 1.16 |

[a]The graft copolymerization was carried out using EtAlCl$_2$ as the activator ([EtAlCl$_2$] = 0.20 M) and THF as a weak Lewis base ([THF] = 2.6 M), in toluene, at 25° C., for 4 hours. The conversion was 100% in each case.
[b]See Table 1.
[c]Concentration of the repeating unit of AEEMA in the block macroinitiator.
[d]The number of side chains (N) is equal to the polymerization degree (m) of AEEMA in the block macroinitiator.
[e]Calculated molecular weight of a poly(IBVE) side chain, $M_g = M_{IVCE}([IBVE]_o/[I]_o)$.
[f]The calculation method is Table 1.
[g]Determined by GPC.
[h]Two times monomer addition experiment. After the cationic polymerization of IBVE in BGP-2 had proceeded for 2 hours, an equal amount of fresh IBVE was added and the polymerization was allowed for an additional 2 hours.

As shown in FIG. 4, the GPC peak (Peak b) of the block macroinitiator (BMI-1 in Table 1, $M_n=4860$, $M_w/M_n=1.07$) disappeared entirely after the graft copolymerization. A new peak (Peak c) due to the block-graft copolymer (BGP-1 in Table 2) emerged and no peak belonging to the block macroinitiator remained. This block-graft copolymer possessed a narrow molecular weight distribution ($M_w/M_n=1.12$); its graft number was 10.7 (the polymerization degree of AEEMA: m=10.7; see Table 1), and the molecular weight of each poly(IBVE) side chain was 218 (Table 2). The determined total molecular weight of the block-graft copolymer ($M_n=6500$) was in good agreement with the calculated value ($M_{n(calcd)}=6700$). The above results indicate that all side chains of the poly(AEEMA) segment in BMI-1 were consumed in initiating the cationic polymerization of IBVE and that the side chains have an almost equal length.

The possibility of molecular control of the side chains was investigated by performing the following parallel experiments. A block macroinitiator (BMI-2) was first prepared. Its THF solution was equally divided between two flasks. The graft copolymerization in the two flasks was carried out under the same conditions but with different amounts of IBVE. In the preparation of BGP-2 and BGP-4 (Table 2), the initial concentrations of IBVE were 0.28 and 0.84 M and the designed molecular weights of the side chains were 333 and 1000, respectively. As shown in FIG. 5, the GPC peaks of BGP-2 (Peak b) and BGP-4 (Peak c) after graft copolymerization appear at higher molecular weights than that of the block macroinitiator (Peak a, $M_n=7770$, $M_w/M_n=1.05$) and BGP-2 and BGP-4 have almost the same narrow molecular weight distribution ($M_w/M_n=1.12$ and 1.14, respectively).

BGP-2 and BGP-4. BGP-2, BGP-3, and BGP-4 possessed the same number of side chains, because the same block macroinitiator was employed (BMI-2; average polymerization degree of 2, m=17.4). However, their side-chain lengths were different, resulting in different total molecular weights. As shown in Table 2, as the side chain becomes longer (from BGP-2 to BGP-4), the determined molecular weight of the block-graft copolymer increases. They are close to the calculated values when the side chains are short and/or the graft number is small (BGP-1 to BGP-3). However, as expected, they are smaller than the calculated values when the side chains are longer (BGP-4) and/or the graft number is large (BGP-5). All the above results indicate that every side chain of the poly(AEEMA) segment of the block macroinitiator is a living site for the cationic graft copolymerization of IBVE, that the polymerization proceeds in a living manner, and that the molecular weight of each side chain can be controlled as well as that of the block backbone.

Example 8

Figure 3B:
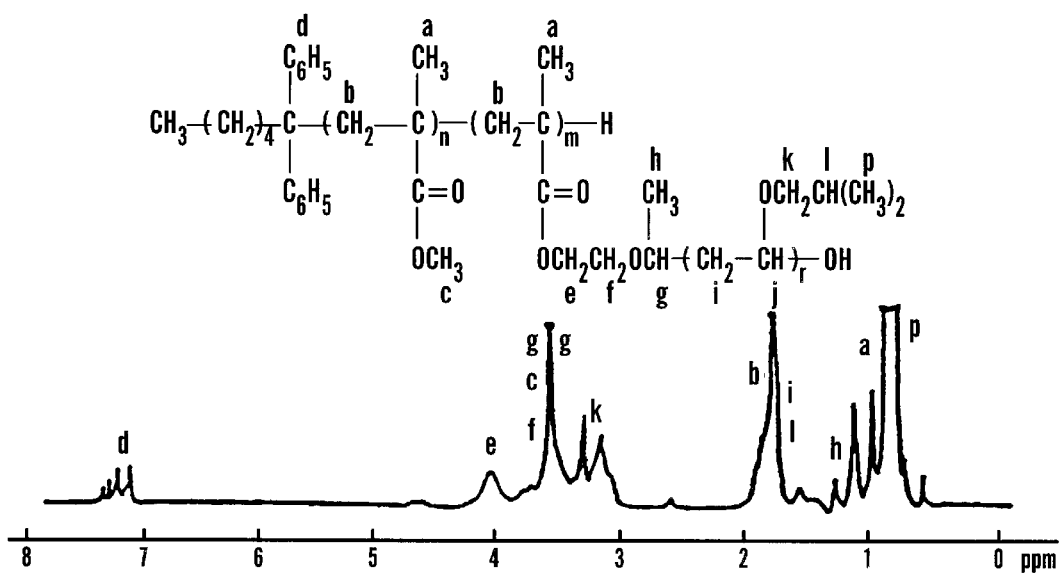
Figure 3C:
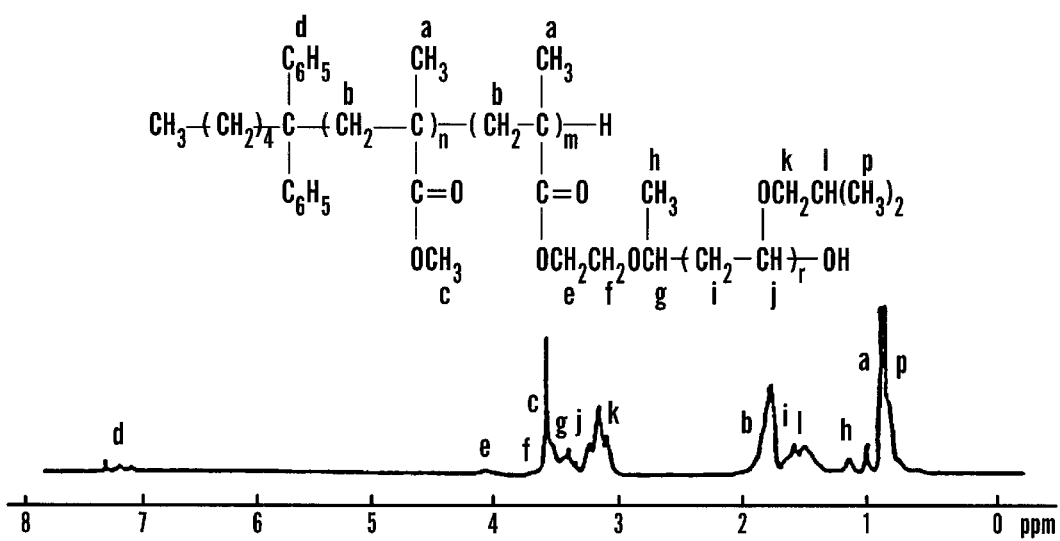

Synthesis of the Star-Shaped Copolymer by the Cationic Polymerization of IBVE to the Block Macroinitiator A star-shaped copolymer consisting of one poly(MMA) arm and several poly(IBVE) arms can be prepared in a way similar to that used for the block-graft copolymer. However, the block macroinitiator should possess a long chain of poly(MMA) but only a few repeating units of AEEMA at one of its ends. The side chains of these repeating units of AEEMA are the living sites for the cationic polymerization of IBVE in the presence of EtAlCl$_2$. In this manner, a star-shaped copolymer can be generated. The length of the poly(MMA) arm and the number of poly(IBVE) arms, which is equal to the number of repeating units of AEEMA, can be controlled during the preparation of the block macroinitiator. In addition, the molecular weight of the poly (IBVE) arms can also be controlled. For instance, in the preparation of SP-2 and SP-4 (Table 3), the same block macroinitiator (BMI-5 of Table 1) was employed so that their arm number is the same (N=1+m=6.1).

star-shaped copolymer (FIG. 3C, SP-1). In the NMR spectrum of BGP-1 (FIG. 3B), the components are in equal amounts and the absorption characteristics of each of the compounds can be easily detected. Indeed, peaks c, e, and p correspond, respectively, to the methyl in the ester group of the poly(MMA) segment, the methylene in the ester group of poly(AEEMA) segment, and the two methyls in the poly(IBVE) side chains. Compared to the above block-graft copolymer, in the $^1$H NMR spectrum of the star-shaped copolymer (FIG. 3C), the absorptions corresponding to the

TABLE 3

Synthesis of the star-shaped copolymer (SP) by cationic polymerization of IBVE to the block macroinitiator[a]

| no. | macroinitiator[b] | $[I]_0^c$, mM | $[IBVE]_0$ M | N[d] | $M_k^e$ | $10^{-4}$ $M_{n(star)}$ calcd[f] | obsd[g] | $M_w/M_n^g$ |
|---|---|---|---|---|---|---|---|---|
| SP-1 | BMI-4 | 34 | 0.74 | 4.4 | 2180 | 1.05 | 1.00 | 1.19 |
| SP-2 | BMI-5 | 24 | 0.34 | 6.1 | 1420 | 1.25 | 1.25 | 1.10 |
| SP-3[h] | BMI-5 | 23 | 0.65 | 6.1 | 2830 | 1.97 | 1.78 | 1.20 |
| SP-4 | BMI-5 | 22 | 1.02 | 6.1 | 4640 | 2.89 | 2.82 | 1.16 |

[a]The cationic polymerization of IBVE was carried out using EtAlCl$_2$ as the activator ([EtAlCl$_2$] = 0.20 M) and THF as a weak Lewis base ([THF] = 2.8 M), in toluene, at 25° C., for 4 hours. The conversion was 100% in each case.
[b]See Table 1.
[c]Concentration of the repeating unit of AEEMA in the block macroinitiator.
[d]Total arm number of star-shaped copolymer N = m + 1, where m is the polymerization degree of AEEMA in the block macroinitiator.
[e]Calculated molecular weight of a poly(IBVE) arm, $M_k = M_{IBVE}([IBVE]_0/[I]_0)$.
[f]The calculation method is explained in Table 1.
[g]Determined by GPC.
[h]Two times monomer addition experiment. After the cationic polymerization of IBVE in SP-2 had proceeded for 2.5 hours, an equal amount of fresh IBVE was added and the polymerization was allowed for an additional 2 hours.

Figure 6:
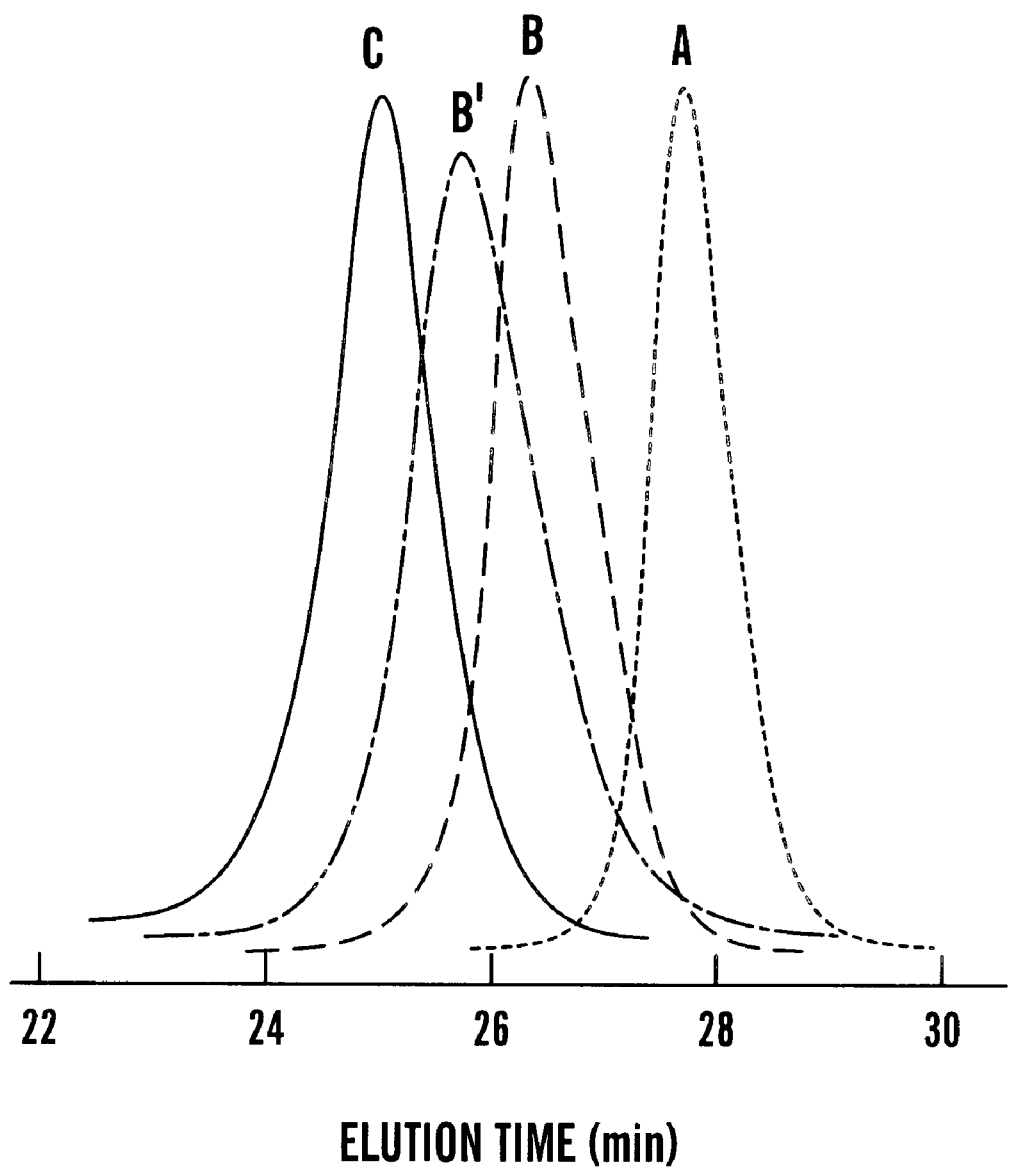
FIG. 6 shows GPC traces for the molecular control of star-shaped copolymers. Peak a is the block macroinitiator (poly(MMA-b-AEEMA), BMI-5 in Table 1, $M_n=5460$, $M_w/M_n=1.06$) prepared by the anionic block copolymerization of MMA and AEEMA. Peak b is the star-shaped co-polymer (SP-2 in Table 3, $M_n=1.25\times10^4 M_w/M_n=1.10$) prepared by the cationic polymerization of IBVE to the above block macroinitiator (BMI-5), using a ratio of $[IBVE]_0/[I]_0=14.2$. Peak b' is SP-3 (Table 3, $M_n=1.78\times10^4$, $M_w/M_n=1.20$) prepared by adding the same amount of IBVE to the above complete polymerization system of Peak b. Peak c is SP-4 (Table 3, $M_n=2.82\times10^4$, $M_w/M_n=1.16$). The amount of IBVE was about 3 times as large as that of Peak b ($[IBVE]_0/[I]_0=46.4$).

However, the amount of IBVE used for SP-4 was 3 times larger than that used for SP-2. As shown in FIG. 6, the molecular weight of SP-4 (Peak c, $M_n$=2.82×10$^4$ $M_w/M_n$=1.16) was larger than that of SP-2 (Peak b, $M_n$=1.25×10$^4$, $M_w/M_n$=1.10). Furthermore, as in the preparation of the block-graft copolymer, when the same amount of fresh IBVE was added to the completely polymerized SP-2, the propagating reaction again took place and a star-shaped copolymer with a larger molecular weight than that of SP-2 was obtained (SP-3 in Table 3, Peak b' in FIG. 6, $M_n$=1.78× 10$^4$, $M_w/M_n$=1.20). As shown in Table 3, although the arm number and the molecular weight of the poly(MMA) arm ($M_n$=4110) in SP-2, SP-3, and SP-4 are the same, the total molecular weights of the star-shaped copolymers are different, because their side-chain lengths are different. The molecular weight of the poly(IBVE) arm is smaller than that of the poly(MMA) arm in SP-2 and SP-3 but is larger in SP-4. As the molecular weight of the poly(IBVE) arm becomes larger (from SP-2 to SP-4), the total molecular weight of the star-shaped copolymer in-creases. These molecular weights were near the calculated values but, as expected, smaller. Therefore, the cationic polymerization of IBVE in the preparation of the star-shaped copolymers also proceeds in a living manner, and the molecular weight of the poly(IBVE) arm can be controlled as well as that of the block backbone.

Example 9

$^1$H NMR Spectra of the Block-Graft and Star-Shaped Copolymer

FIG. 3 depicts the $^1$H NMR spectra of AEEMA (FIG. 3A), the block graft copolymer (FIG. 3B, BGP-1), and the poly(AEEMA) segment can hardly be observed, because the weight ratio of the three components is MMA:AEEMA:IBVE=3:1:10. This copolymer can be considered to be a star-shaped copolymer consisting of just two components, the poly(MMA) arm and the poly(IBVE) arms.

Example 10

Block-Graft and Star-Shaped Copolymers by Continuous Transformation from Anionic to Cationic Polymerization The diblock copolymer of MMA and AEEMA [poly (MMA-b-AEEMA)] was prepared by the sequential anionic block copolymerization of MMA and AEEMA, in the presence of LiCl, using (1,1-diphenylhexyl)lithium as the initiator, in THF, at −60° C. This block copolymer had a controllable molecular weight and composition and a narrow molecular weight distribution ($M_w/M_a$=1.05–1.13).

A block-graft copolymer consisting of a poly(MMA-b-AEEMA) block backbone and poly(isobutyl vinyl ether) [poly-(IBVE)] side chains attached to the poly(AEEMA) segment was prepared by a continuous transformation from anionic to cationic polymerization. After the anionic block copolymerization of MMA and AEEMA in THF, toluene, IBVE, and EtAlCl$_2$ were introduced into the THF solution of poly(MMA-b-AEEMA) at room temperature. Under these conditions, every side chain of the poly(AEEMA) segment in poly(MMA-b-AEEMA) was activated by EtAlCl$_2$ to initiate the living cationic polymerization of IBVE. In this manner, a block-graft copolymer with designed graft number, controlled molecular weights of both the backbone and side chains, and narrow molecular weight distribution ($M_w/M_n$=1.11–1.16) was obtained.

Using a similar procedure, a star-shaped copolymer consisting of one poly(MMA) arm and several poly(IBVE) arms was prepared, by restricting the polymerization degree of AEEMA to a small value. This star-shaped copolymer also possessed a designed arm number, controllable molecular weight, and narrow molecular weight distribution ($M_w/M_n$= 1.10–1.20).

Example 11

Materials for Preparation of Graft Copolymers with Functional or Block Poly(vinyl ether) Side Chains Tetrahydrofuran ("THF") was dried with $CaH_2$ under reflux for more than 24 hours, distilled, and distilled again from a solution of 1,1-diphenylhexyllithium ("DPHL") just before use. Toluene was washed with concentrated sulfuric acid and then with water, dried with $MgSO_4$, distilled over $CaH_2$, and finally distilled from a DPHL solution before use. Hexane was first dried and distilled over $CaH_2$ and then distilled from a solution of n-BuLi. Methyl methacrylate ("MMA", Aldrich, 99%), isobutyl vinyl ether ("IBVE"; Aldrich, 99%) or 2-chloroethyl vinyl ether (ClVE; Aldrich, 99%) was washed with a 10% aqueous sodium hydroxide solution and then with water, dried overnight with $MgSO_4$, and distilled twice over $CaH_2$ prior to polymerization. 1,1-Diphenylethylene ("DPE", Aldrich, 97%) was distilled over $CaH_2$ and then distilled in the presence of DPHL under reduced pressure. Lithium chloride (Aldrich, 99.99%) was dried at 120° C. for 24 hours and dissolved in THF. n-BuLi (Aldrich, 1.6 M solution in hexane) and $EtAlCl_2$ (1.8 M solution in toluene) were diluted with purified hexane and toluene, respectively.

Example 12

Syntheses of 2-vinyloxyethyl methacrylate ("VEMA"), 2-acetoxyethyl Vinyl ether ("AcVE") and 2-(1-acetoxyethoxy)ethyl Methacrylate ("AEEMA")

Figure 7:
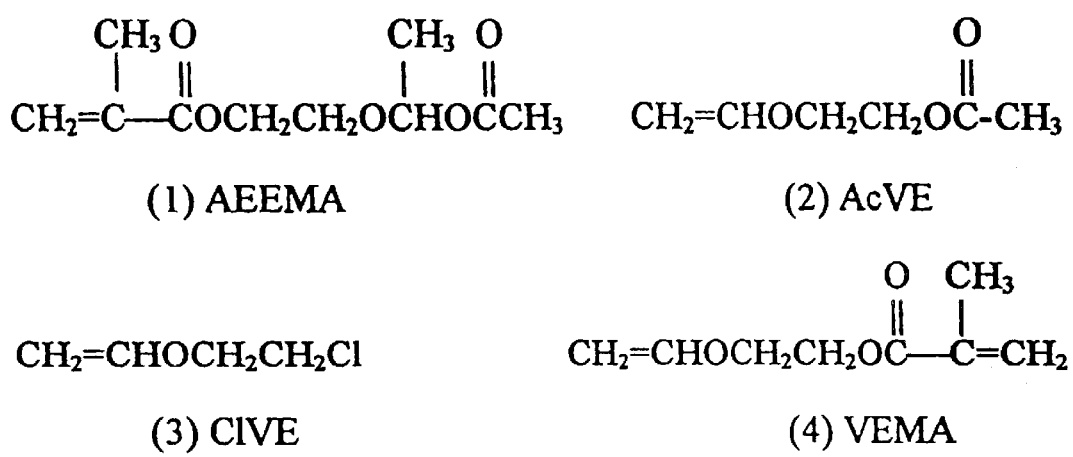
FIG. 7 shows the molecular structures of functional monomers: 2-(1-acetoxyethoxy)ethyl methacrylate ("AEEMA"); 2-acetoxyethyl vinyl ether ("AcVE"); 2-chloroethyl vinyl ether ("ClVE"); and 2-vinyloxyethyl methacrylate ("VEMA").

VEMA and AcVE were prepared by reacting 2-chloroethyl vinyl ether (Aldrich, 99%) with sodium methacrylate (Aldrich, 99%) and sodium acetate (Aldrich, 99%), respectively, under reflux with stirring, in the presence of a small amount of phase transfer catalyst (tetrabutylammonium iodide) and an inhibitor (4-tert-butylcatechol) (Aoshima et al., *Polymer Bull.* 13:229 et seq. (1985); Aoshima et al., *Macromolecules* 18:2097 et seq. (1985), which are hereby incorporated by reference). AEEMA was synthesized by the addition reaction between VEMA and acetic acid (Zhang et al., *Macromolecules* 31:746–752 (1998); Ruckenstein et al., *Macromolecules* 31:2977–2982 (1998), which are hereby incorporated by reference) (see FIG. 7). Prior to polymerization, these monomers were doubly distilled over $CaH_2$, under reduced pressure.

Example 13

Preparation of a Living Random Copolymer of MMA and AEEMA [poly(MMA-co-AEEMA]

All the polymerizations were carried out in a round-bottom glass flask under an over pressure of argon with magnetic stirring. The anionic random copolymerization of MMA and AEEMA was performed in THF, at −60° C., in the presence of LiCl ([LiCl]/[DPHL]$_0$=2). After THF, DPE, and a THF solution of LiCl were added with dry syringes, the flask was cooled to −40° C. and n-BuLi (in hexane) was added. The deep red color of DPHL appeared at once, and the reaction between n-BuLi and DPE was allowed to continue for 15 minutes. Then, the system was cooled to −60° C. and the copolymerization was induced by adding a prechilled mixture of MMA and AEEMA, and allowed to last 50 minutes. Without termination and polymer separation, this THF solution was equally divided into 4 or 6 parts, which were further used in the next step of the preparation of the graft copolymer with functional, random, or block side chains.

Example 14

Synthesis of a Graft Copolymer with Functional, Random, or Block Side Chains

Upon the random copolymerization of MMA and AEEMA, purified toluene and a toluene solution of $EtAlCl_2$ were added to the THF solution of poly(MAA-co-AEEMA). After the temperature was raised to 20° C., a functional monomer (AcVE, ClVE, or VEMA) was introduced to start the graft copolymerization. For graft copolymers with random copolymer side chains, a mixture of IBVE and AcVE, ClVE, or VEMA was added. For graft copolymers with block side chains, two polymerization sequences, namely a functional monomer-IBVE or vice versa, were used. After a selected time, the system was quenched by using a mixture of MeOH and an aqueous solution of ammonia. The quenched mixture was washed with diluted hydrochloric acid and then with water, evaporated to dryness under reduced pressure, and vacuum-dried to obtain the polymer.

Example 15

Measurements $^1$H NMR spectra were recorded in $CDCl_3$ on an INOVA-400 spectrometer. $M_n$ and $M_w/M_n$ of the polymer were determined by gel permeation chromatography ("GPC") on the basis of a polystyrene calibration curve. The GPC measurements were carried out using THF as solvent, at 30° C., with a 1.0 mL/minute flow rate and a 1.0 cm/minute chart speed. Three polystyrene gel columns (Waters, 7.8×300 mm; one HP 5E, Part No. 44228, one Linear, Part No. 10681, and one HR 4E, Part No. 44240) were used, which were connected to a Waters 515 precision pump. The molecular weight was also determined by $^1$H NMR.

Example 16

Preparation of a THF Solution of a Living Random Copolymer of MMA and AEEMA [poly(MMA-co-AEEMA)]

The backbone of the copolymer was designed as a random copolymer of MMA and AEEMA, which was prepared by living anionic random copolymerization. By regulating the feed amount ratio of the two monomers and/or changing the initiator concentration (Table 4), the polymerization degree of AEEMA, hence the graft number of the final graft copolymer, could be well controlled. The anionic random copolymerization was carried out using a bulky initiator DPHL, in THF, at −60° C., in the presence of LiCl ([LiCl]/[n-BuLi]$_0$=2) (Fayt et al., *Macromolecules* 20:1442 et seq. (1987); Varshney et al., *Macromolecules* 25:4457 et seq. (1992), which is hereby incorporated by reference). The reaction was started by adding a mixture of MMA and AEEMA to the THF solution of the initiator, and allowed to last 50 minutes. As shown in Table 4, the polymer yield was quantitative in every case, the determined molecular weight of the random copolymer was close to the calculated value, and the MWD was very narrow ($M_w/M_n$=1.05~1.09).

TABLE 4

Preparation of the living random copolymers (RCP) of MMA and AEEMA[a]

| no. | [MMA]$_0$ M | [ABBMA]$_0$ M | [n-BuLi]$_0$ mM | 10$^{-3}$ M$_n$ Calcd | Obsd[b] | M$_w$/M$_n$[b] | n/m[c] |
|---|---|---|---|---|---|---|---|
| RCP-1 | 0.750 | 0.116 | 12.5 | 8.24 | 8.85 | 1.07 | 64.6/10.0 |
| RCP-2 | 0.667 | 0.154 | 10.0 | 10.2 | 11.1 | 1.09 | 72.4/16.8 |
| RCP-3 | 0.750 | 0.116 | 16.7 | 6.23 | 6.73 | 1.08 | 48.7/7.51 |
| RCP-4 | 0.750 | 0.116 | 8.35 | 12.2 | 11.9 | 1.05 | 87.5/13.4 |

[a]The initiator DPHL was first prepared in situ through the reaction of n-BuLi and DPE ([DPEI]/[n-BuLi]$_0$ = 1.2) in the presence of LiCl ([LiCl]/[n-BuLi]$_0$ = 2), in THF, at $-40°$ C., for 15 minutes. The anionic copolymerization was started by adding a prechilled mixture of MMA and AEEMA to the above system and the reaction was allowed to last 50 minutes at $-60°$ C. The polymer yield was quantitative in every case.
[b]Determined by GPC.
[c]n and m: average polymerization degrees of MMA and AEEMA in the copolymer, respectively.

Figure 8:
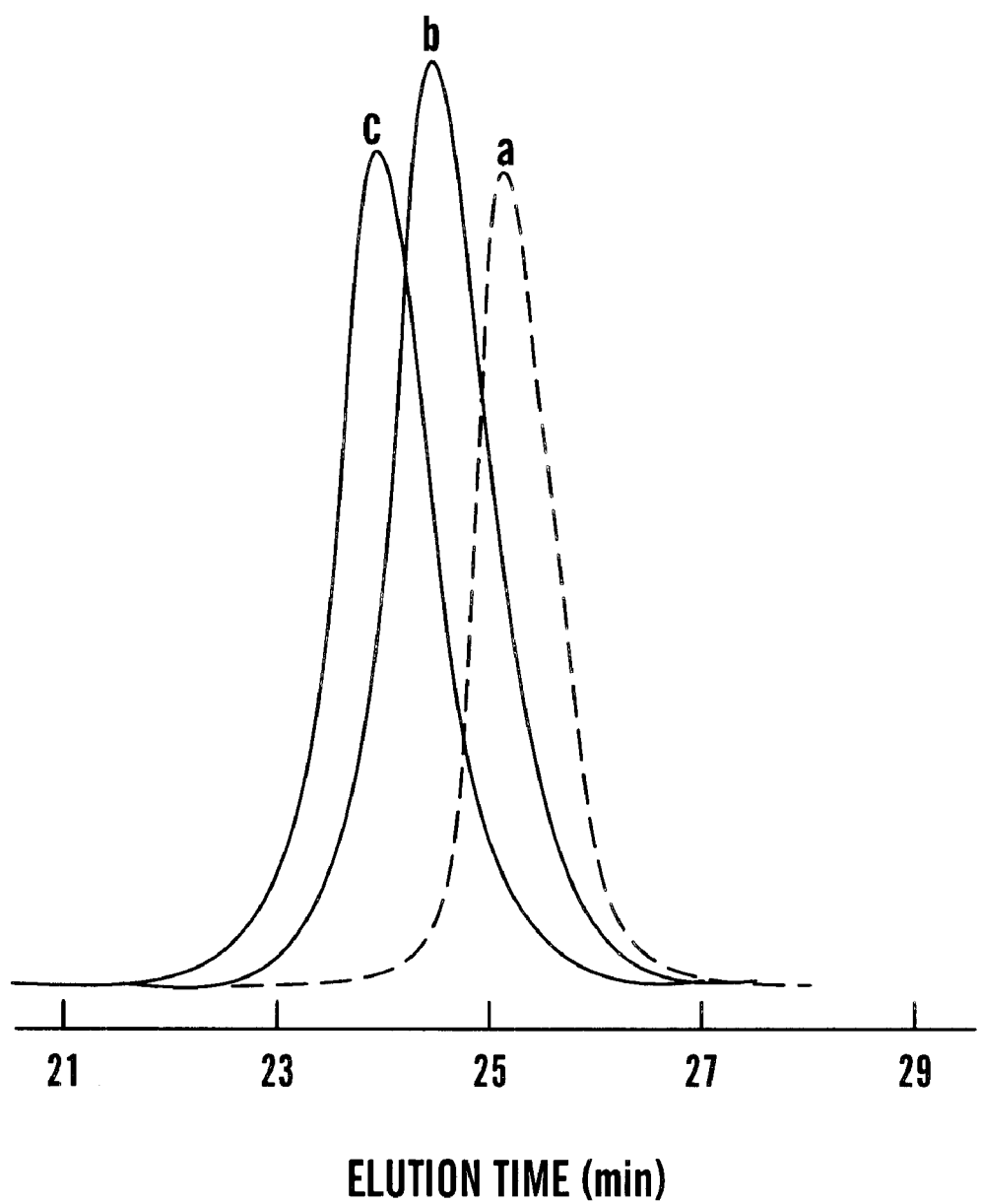
FIG. 8 shows GPC traces of graft copolymers (Peaks b and c) containing poly(AcVE) side chains and their precursor. Peak a is poly(MMA-co-AEEMA) (RCP-1 in Table 4, $M_n=8850$, $M_w/M_n=1.07$). Peak b is graft copolymer GCP-1 (Table 5, $M_{n(NMR)}=18100$, $M_{n(GPC)}=12100$, $M_w/M_n=1.17$). Peak c is graft copolymer GCP-2 (Table 5, $M_n=25900$, $M_{n(GPC)}=18800$, $M_w/M_n=1.13$). GCP-1 and GCP-2 were prepared by the cationic graft copolymerization of AeVE from the same backbone polymer RCP-I (Peak a) at different initial monomer concentrations, $[AcVE]_0=0.186$ and 0.372 M, respectively.
Figure 9:
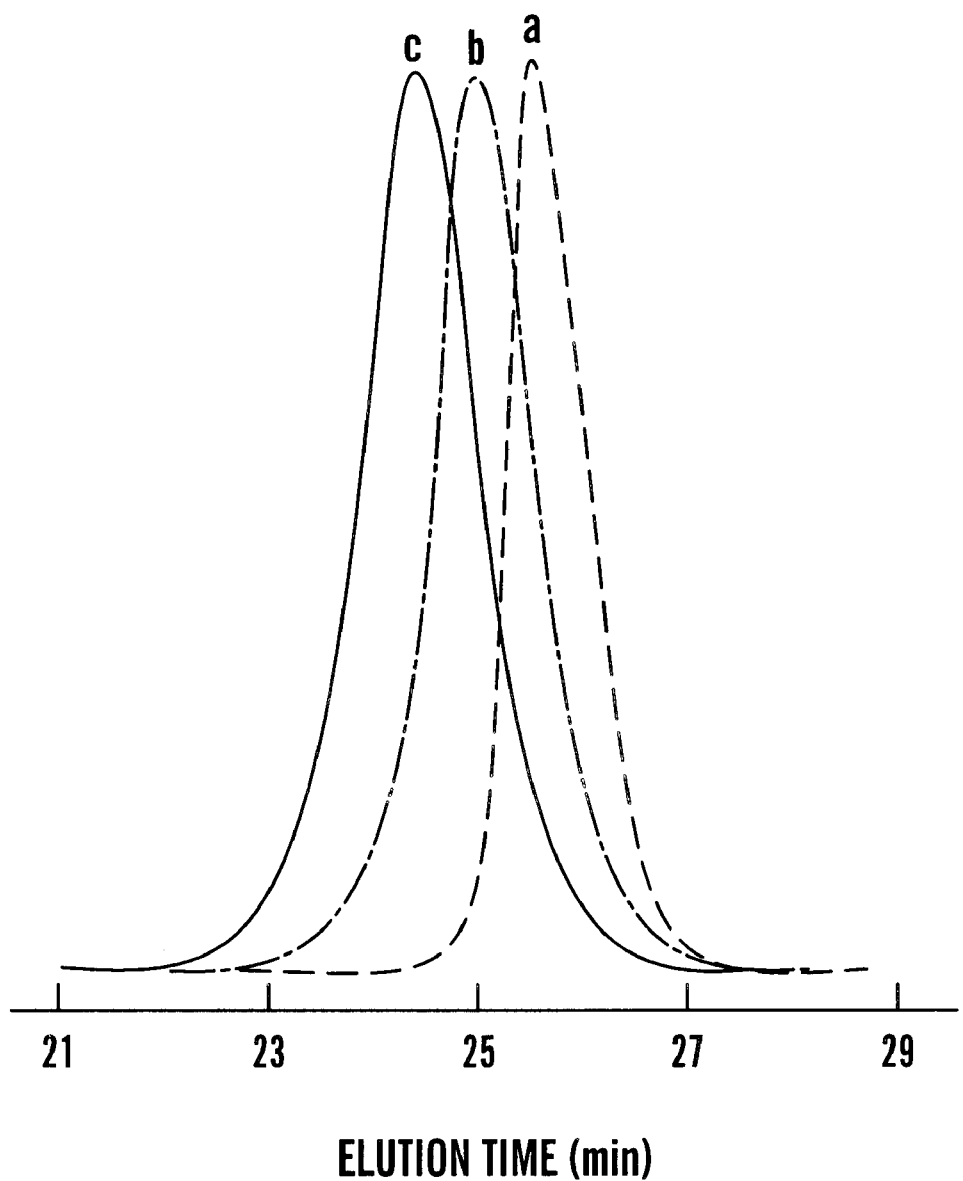
FIG. 9 shows GPC traces of graft copolymers (Peaks b and c) containing poly(AcVE) side chains prepared in a two times monomer addition experiment and of their precursor. Peak a is poly(MMA-co-AEEMA) (RCP-3 in Table 4, $M_n=6730$, $M_w/M_n=1.08$). Peak b is the graft copolymer ($M_{n(GPC)}=11300$, $M_w/M_n=1.13$) obtained in the graft copolymerization of AcVE from poly(MMA-co-AEEMA) $[I]_0= [AEEMA]_0=24.2$ mM, $[AcVE]_0=0.280$ M). Peak c is the graft copolymer ($M_{n(NMR)}=29500$, $M_{n\ (GPC)}=16800$, $M_w/M_n=1.17$) obtained after graft copolymerization by adding the same amount of AcVE to the graft copolymer of Peak b.
Figure 10:
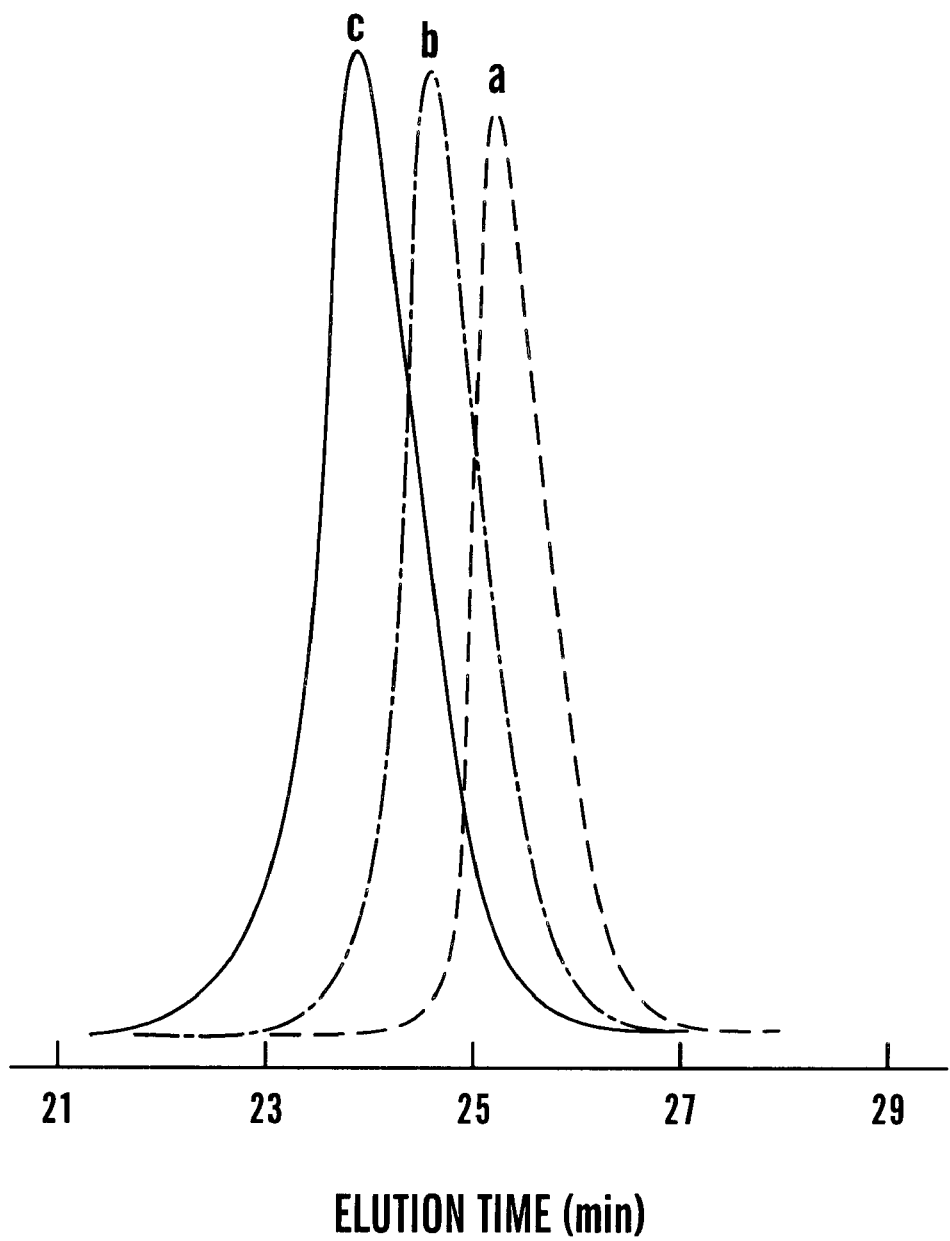
FIG. 10 shows GPC traces of a graft-block copolymer (Peak c) consisting of poly(MMA-co-AEEMA) backbone and poly(VEMA-b-IBVE) side chains and of its precursors. Peak a is poly(MMA-co-AEEMA) (RCP-4 in Table 4, $M_n=11900$, $M_w/M_n=1.05$). Peak b is the graft copolymer with poly(VEMA) side chains ($M_{n(GPC)}=18800$, $M_w/M_n=1.12$) prepared by the cationic graft copolymerization of VEMA from poly(MMA-co-AEEMA). Peak c is the graft copolymer with block side chains (GBP-5 in Tables 7 and 8, $M_{n(NMR)}=46800$, $M_{n(GPC)}=29500$, $M_w/M_n=1.15$) obtained by the graft polymerization of IBVE from the graft copolymer with poly(VEMA) side chains.

As illustrated in FIG. 8, (Peak a, RCP-1 in Table 4, M$_n$=8850, M$_w$/M$_n$=1.07), FIG. 9 (Peak a, RCP-3 in Table 4, M$_n$=6730, M$_w$/M$_n$=1.08) and FIG. 10 (Peak a, RCP-4 in Table 4, M$_n$=11900, M$_w$/M$_n$=1.05), the GPC chromatogram of every copolymer exhibited a sharp, symmetrical peak. These results indicated that the copolymerization was not accompanied by side reactions. The copolymers possess various molecular weights and polymerization degrees of AEEMA. Therefore, the resulting graft copolymers had different graft numbers, because every AEEMA unit will act as a living; site for the cationic graft copolymerization of the vinyl ether monomers in the grafting step. Without quenching and polymer separation, the THF solution of each of the copolymers was directly used as the macroinitiator in the next cationic graft copolymerization step.

Example 17

Synthesis of a Graft Copolymer with Functional Side Chains

Tremendous progress has been accomplished in the controlled cationic polymerization in the last two decades (Sawamoto, *Prog. Polym. Sci.* 16:111 et seq. (1991); Majoros et al., *Adv. Polym. Sci.* 112:1 etseq. (1994); Faust et al., *Polym. Sci. Polym. Chem.* 25:1847 et seq. (1987); Fodor et al., *Macromol. Sci.; Pure Appl. Chem.* A32:575 et seq. (1995); Matyjaszewski, *Makromol. Chem., Macromol. Symp.* 13/14:433 et seq. (1988), which are hereby incorporated by reference). For the vinyl ether monomers, the controlled polymerization was achieved via the stabilization of the propagating site with either a suitable counteranion or a weak Lewis base. For instance, the initiator system HI/I$_2$ (Miyamoto et al., *Macromolecules* 17:2228 et seq. (1984), which is hereby incorporated by reference) provides the counteranion I . . . I$_2$ and the initiator system CH$_3$CH(OiBu) OCOCH$_3$/Lewis base/EtAlCl$_2$ (Aoshima et al., *Macromolecules* 22:1009 et seq. (1989); Kamigaito et al., *Macromolecules* 22:3877 et seq. (1989); Kamigaito et al., *Macromolecules* 24:3988 et seq. (1991), which are hereby incorporated by reference) contains a weak Lewis base. The former initiator system, which was initially employed for the normal vinyl ethers, such as IBVE, was also used for the functional vinyl ether monomers, such as VEMA and AcVE (Aoshima et al., *Polym. Bull.* 13:229 et seq. (1985); Aoshima et al., *Macromolecules* 18:2097 et seq. (1985), which are hereby incorporated by reference), which constitute suitable grafting monomers of the present invention. The linkage between the acetoxy and 1-(isobutoxy)ethyl groups of 1-(isobutoxy) ethyl acetate (IBEA) of the latter initiator system can be activated via the Lewis acid EtAlCl$_2$ to induce the cationic polymerization of the vinyl ether. However, this polymerization cannot be controlled without a Lewis base, because the nucleophilicity of the binary counteranion ($^-$OCOCH$_3$ . . . EtAlCl$_2$) is too weak to stabilize the propagating site. The presence of a weak Lewis base, such as THF, 1,4-dioxane, or ethyl acetate, stabilizes the propagating site, thus allowing the polymerization to proceed in a living manner (Aoshima et al., *Macromolecules* 22:1009 et seq. (1989); Kamigaito et al., *Macromolecules* 22:3877 et seq. (1989); Kamigaito et al., *Macromolecules* 24:3988 et seq. (1991), which are hereby incorporated by reference).

The side chain of every AEEMA unit of the poly(MMA-co-AEEMA) backbone had a molecular structure similar to that of the initiator, IBEA. In the presence of EtAlCl$_2$, every ABEMA unit became an initiating site for the cationic polymerization of the functional vinyl ether. In addition, the THF, which was used as the solvent in the preparation of the random copolymer of MMA and AEEMA, acted as a weak Lewis base in the cationic grafting step.

To a THF solution of poly(MMA-co-AEEMA), EtAlCl$_2$, toluene, and a monomer (AcVE, ClVE or VEMA) were added sequentially and the graft copolymerization was carried out at ambient temperature. FIG. 8 presents the chromatograms of two graft copolymers GCP-1 (Peak b) and GCP-2 (Peak c) with poly(AcVE) side chains (see Table 5).

TABLE 5

Preparation of graft copolymers (GCP) with functional side chains[a]

| No. | backbone[b] | [I]$_0$[c] mM | Monomer Name | [M]$_0$/M | time H | conv. % | M$_k$[d] | N[e] | 10$^{-4}$ M$_n$ calcd | NMR[f] | GPC[g] | M$_w$/M$_n$[g] |
|---|---|---|---|---|---|---|---|---|---|---|---|---|
| GCP-1 | RCP-1 | 24.2 | AcVE | 0.186 | 4 | 100 | 1000 | 10.0 | 1.84 | 1.81 | 1.21 | 1.17 |
| GCP-2 | RCP-1 | 24.2 | AcVE | 0.372 | 4 | 90 | 1800 | 10.0 | 2.64 | 2.59 | 1.88 | 1.13 |

TABLE 5-continued

Preparation of graft copolymers (GCP) with functional side chains[a]

| No. | backbone[b] | $[I]_0$[c] mM | Monomer Name | $[M]_0/M$ | time H | conv. % | $M_k$[d] | $N$[e] | $10^{-4} M_n$ calcd | NMR[f] | GPC[g] | $M_w/M_n$[g] |
|---|---|---|---|---|---|---|---|---|---|---|---|---|
| GCP-3 | RCP-2 | 32.1 | AcVE | 0.247 | 4 | 100 | 1000 | 16.8 | 2.72 | 2.62 | 2.02 | 1.15 |
| GCP-4 | RCP-1 | 24.2 | ClVE | 0.226 | 4 | 49 | 490 | 10.0 | 1.33 | 1.34 | 1.25 | 1.14 |
| GCP-5 | RCP-1 | 24.2 | ClVE | 0.452 | 4 | 43 | 860 | 10.0 | 1.70 | 1.75 | 1.59 | 1.13 |
| GCP-6 | RCP-3 | 24.2 | ClVE | 0.452 | 8 | 77 | 1540 | 7.51 | 1.79 | 1.65 | 1.33 | 1.19 |
| GCP-7 | RCP-3 | 24.2 | VEMA | 0.310 | 6 | 82 | 1640 | 7.51 | 1.87 | 1.98 | 1.11 | 1.13 |
| GCP-8 | RCP-2 | 32.1 | VEMA | 0.267 | 8 | 100 | 1300 | 16.8 | 3.22 | 3.11 | 2.01 | 1.18 |

[a]The graft copolymerization was carried out using EtAlCl$_2$ as the activator ([EtAlCl$_2$] = 0.23 M) and THF as a weak Lewis base ([THF] = 2.2 M), in toluene, at 20° C.
[b]See Table 4.
[c]Concentration of the repeating units of AEEMA in the copolymer poly(MMA-co-AEEMA).
[d]Calculated molecular weight of each side chain.
[e]The graft number (N) is equal to the polymerization degree (m) of AEEMA in the backbone copolymer.
[f]Determined by $^1$H NMR based on the $M_n$ of the corresponding backbone.
[g]Determined by GPC.

Both were prepared using the same backbone polymer, RCP-1 (Peak a, $M_n$=8850, $M_w/M_n$=1.07, see Table 4). In the case of GCP-1, the Peak a of the precursor polymer disappeared after the graft copolymerization and a new peak (Peak b) corresponding to the resulting graft copolymer emerged. In the case of GCP-2, similar results were obtained, except the molecular weight ($M_{n(NMR)}$=25900, $M_{n(GPC)}$=18800, $M_w/M_n$=1.13) was larger than that of GCP-1 ($M_{n(NMR)}$=18100, $M_{n(GPC)}$=12100, $M_w/M_n$=1.17), because the amount of AcVE employed for GCP-2 was twice as large. As shown in Table 5, the molecular weight of a side chain of GCP-2 is higher ($M_k$=1800) than that of GCP-1 ($M_k$=1000). On the other hand, GCP-1 and GCP-3 had the same length of the side chains ($M_k$=1000), but different graft numbers (10.0 and 16.8, respectively), because different backbone polymers were employed (RCP-1 and RCP-2, respectively). Besides the narrow MWDs of these three functional graft copolymers ($M_w/M_n$=1.13~1.17), their molecular weights determined by $^1$H NMR were consistent with those calculated. The molecular weights determined by GPC were smaller because of their smaller hydrodynamic volumes than those of the corresponding linear polymers. The above results indicate that: (1) each of the graft copolymer has a high purity and is free of its precursor polymer; (2) the molecular weight of each side chain can be well controlled by the feed amount ratio of $[M]_0/[I]_0$, where $[M]_0$ and $[I]_0$ are the initial concentrations of the functional monomer and of the AEEMA units of the backbone polymer, hence, the total molecular weight of the graft copolymer can be also controlled; (3) every side chain of an AEEMA unit of the backbone polymer was consumed in initiating the cationic polymerization of the functional monomer; and (4) the side chains have an almost equal length, because the MWD is very narrow.

A two successive monomer addition experiment was also carried out to verify the living characteristic of the cationic graft copolymerization of the functional monomer. The RCP-3 (Table 4, $M_n$=6730, $M_w/M_n$=1.08) was used as the backbone polymer and the polymerization conditions and results are listed in FIG. 9. After the first step polymerization of AcVE proceeded for 3.5 hours, the GPC peak (Peak a) of RCP-3 shifted toward the shorter elution time region. A graft copolymer with a higher molecular weight and a narrow MWD ($M_{n(GPC)}$=11300, $M_w/M_n$=1.13) was produced (Peak b). To this polymerization system, the same amount of fresh AcVE was further added and the reaction was allowed to last additional 4 hours. As shown in FIG. 9, Peak b shifted to Peak c, implying the formation of a new graft copolymer with a higher molecular weight ($M_{n(GPC)}$=16800, $M_w/M_n$=1.17) than that obtained in the first step. The determined molecular weight by $^1$H NMR ($M_{n(NMR)}$=29500) was close to the calculated value ($M_{n(calcd)}$=28900). Despite the increase of the molecular weight from the first to the second step, the MWD remains narrow (FIG. 9). Therefore, the graft copolymerization proceeded in a living manner without the occurrence of side reactions.

ClVE could also undergo cationic graft copolymerization from a poly(MMA-co-AEEMA) backbone to generate a graft copolymer containing chloroalkyl groups in every side chain. The polymerization rate of this monomer was, however, much slower than that of AcVE. For instance, GCP-1 and GCP-4 were prepared under the same conditions and designed to have side chains with the same molecular weight ($M_k$=1000). The complete conversion of AcVE occurred in 4 hours, and during this time only 49% of ClVE was polymerized. Due to the shorter side chains of GCP-4 ($M_k$=490), its total molecular weight ($Mn_{NMR}$=13400) was smaller than that of GCP-1 ($M_{n(NMR)}$=18100). When the designed molecular weight of the side chain was doubled ($M_k$=2000), the monomer conversion of AcVE (GCP-2) and ClVE (GCP-5) reached 90 and 43% after 4 hours, respectively. When the polymerization was allowed to last 8 hours, 77% of ClVE participated in the reaction (GCP-6). It was clear that the polymerization rate of ClVE is about half that of AcVE. The presence of the strong electron-withdrawing chloroethyl group was probably responsible for the reduced reactivity of the propagating site. The molecular weights of the graft copolymers containing poly(ClVE) side chains, determined by $^1$H NMR, were in good agreement with those calculated based on the monomer conversion, and the MWDs were very narrow (GCP-4 to GCP-6 in Table 5, $M_w/M_n$=1.13~1.19).

VEMA has both a cationically and an anionically polymerizable C=C double bond. In fact, the graft copolymerization of this monomer from the poly(MMA-co-AEEMA) backbone is a selective cationic polymerization process of its vinyloxy group. Because of the presence of an unreacted methacryloyl group in every repeating unit of the side chain, the resulting graft copolymer is expected to be a useful precursor in the preparation of polymers with complex architectures. The graft copolymerization of this monomer also proceeded smoothly under the conditions similar to those employed for AcVE and ClVE. When the designed molecular weight of the side chain was 2000, the monomer conversion reached 82% in 6 hours (GCP-7). By comparing the GCP-2, GCP-6 and GCP-7 (Table 5), one can conclude that the graft polymerization rates of the three functional monomers are in the sequence AcVE>VEMA>ClVE. Similar to AcVE and ClVE, the graft copolymers containing poly(VEMA) side chains possess controlled molecular weights and narrow MWDs ($M_w/M_n$=1.133~1.18; GCP-7 and -8, Table 5).

Figure 11A:
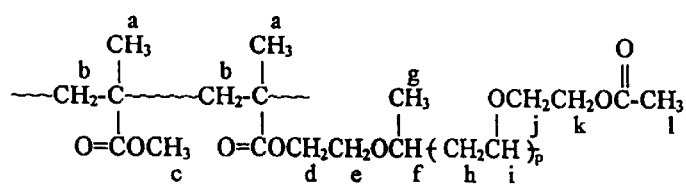
FIGS. 11A–C show the $^1$H NMR spectra of graft copolymers with poly(AcVE) (FIG. 11A; GCP-2), poly(ClVE) (FIG. 11B; GCP-5), and poly(VEMA) (FIG. 11C; GCP-8) side chains, respectively (see Table 5). Peak r: $C_6H_5$ moiety of the initiator DPHL.
Figure 11A:
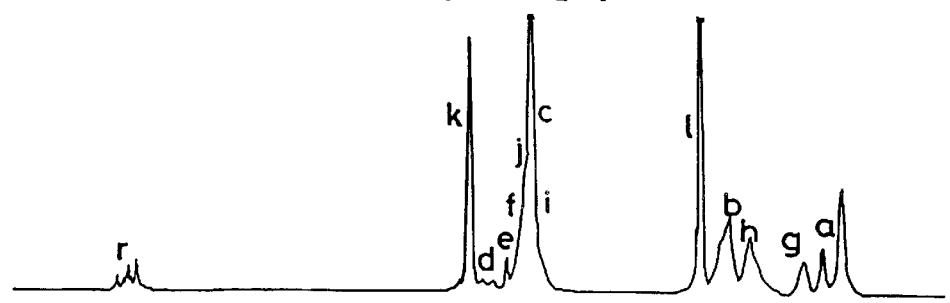
Figure 11B:
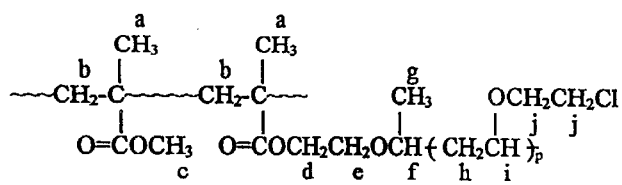
Figure 11B:
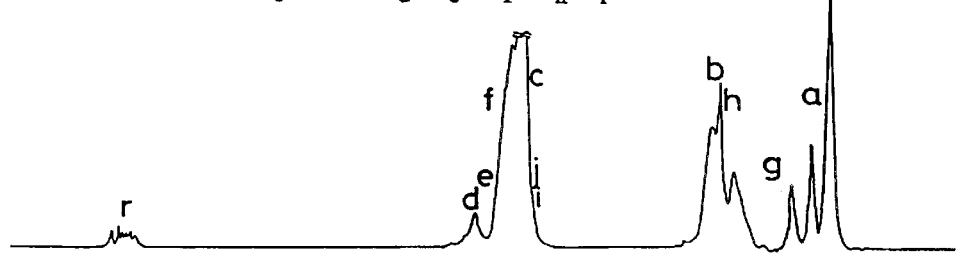
Figure 11C:
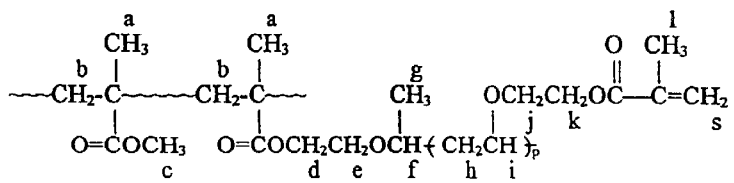
Figure 11C:
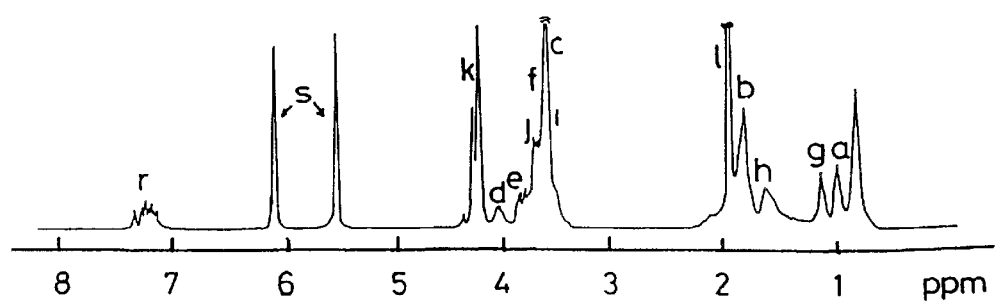

FIG. 11 depicts the $^1$H NMR spectra of three graft copolymers containing poly(AcVE) (FIG. 11A; GCP-2), poly(ClVE) (FIG. 11B; GCP-5) and poly(VEMA) (FIG. 11C; GCP-8) side chains, respectively. Besides the absorptions a, b, c, d e, f and g corresponding to the backbone polymer, there are also the absorptions h, i, j, k and l in A, h, i and j in B, and h, i, j, k, l and s in C due to the side chains. The composition of the graft copolymer calculated according to the peak intensities coincided with the feed ratio of the monomers, and the molecular weights determined by $^1$H NMR were close to those calculated (Table 5). In addition, as shown by FIG. 11C, no peak corresponding to $CH_2$= (3.90 and 4.10 ppm) and =CH—O (6.60 ppm) of the vinyloxy group was present, but those due to $CH_2$=(5.55 and 6.10 ppm) and =$CCH_3$ (1.95 ppm) of the methacryloyl group were present quantitatively. This means that the vinyloxy group had selectively reacted in the graft copolymerization of VEMA, but its methacryloyl group remained unchanged. Because the graft copolymers based on VEMA are soluble in numerous solvents, such as THF, toluene, chloroform, etc., no cross-linking side reaction occurred in the graft copolymerization of VEMA.

Example 18

Synthesis of a Graft Copolymer with Random Copolymer Side Chains

Figure 12A:
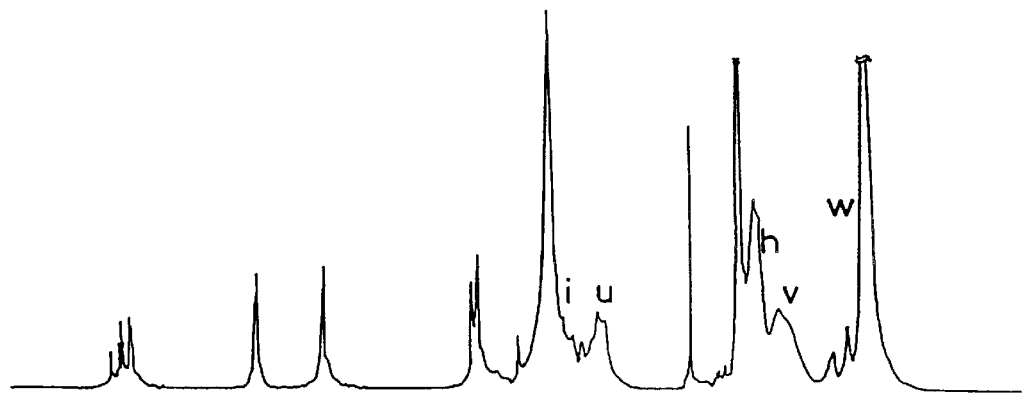
FIGS. 12A–B show the $^1$H NMR spectra of graft copolymers with poly(VEMA-co-IBVE) (FIG. 12A; GRP-3 in Table 6) and poly(AcVE-b-IBVE) (FIG. 12B; GBP-1 in Tables 7 and 8) side chains, respectively. Comparing FIG. 12A with FIG. 11C, and FIG. 12B with FIG. 11A, the following absorptions due to IBVE units are also present quantitatively: h, $CH_2CHO$; i, $CH_2CHO$; u, $OCH_2CH$; V, $CH_2CHC$; and w, $CH_3$.

Because each of the functional monomers and IBVE (Zhang et al., *Macromolecules* 31:746–752 (1998); Ruckenstein et al., *Macromolecules* 31:2977–2982 (1998), which are hereby incorporated by reference) can undergo cationic graft copolymerization smoothly from the activated AEEMA units of the backbone polymer, their copolymerization by adding two monomers simultaneously was expected to generate a graft copolymer with random copolymer side chains. The contents of the functional groups in the side chains can be controlled by regulating the feed ratio of IBVE and any of the functional monomers. For IBVE and AcVE (GRP-1 in Table 6), IBVE and ClVE, (GRP-2), and IBVE and VEMA (GRP-3), the graft copolymerizations were carried out with the same backbone polymer (RCP-3 in Table 4, $M_n$=6730, $M_w/M_n$=1.08) under the same conditions. Their designed side chain molecular weight was 2000 and the feed weight ratio of the two, monomers was 50/50. In contrast to the polymerization of each monomer alone, the monomer conversion reached 100% in 6.5 hours in each case. It appeared that the reactivity of the functional monomer was promoted by the coexistence with IBVE. In addition, the three graft copolymers obtained possessed almost the same molecular weights and MWDs ($M_w/M_n$= 1.13~1.19, Table 6). As an example, the $^1$H NMR spectrum of the graft copolymer containing poly(VEMA-co-IBVE) side chains (GRP-3) is presented in FIG. 12A. Comparing FIGS. 12A and 11C, one can observe that besides the absorptions belonging to the backbone and VEMA units, the peaks of the IBVE units (h, i, u, v, and w, see description of FIG. 12) were also present quantitatively. The calculated molecular weight of the graft copolymer based on the peak, intensities was close to the designed value. The above results indicate that both IBVE and the functional monomer participated in the graft copolymerization and that a well-defined graft copolymer with random copolymer side chains was obtained.

Example 19

Synthesis of a Graft Copolymer with Block Side Chains (Graft-Block Copolymer)

As noted above, the random cationic copolymerization of each of the functional monomers with IBVE can proceed smoothly. This implies that the living site formed from IBVE can initiate the cationic polymerization of a functional monomer or vise versa. Therefore, the block copolymerization by a sequential monomer addition was expected to produce a graft copolymer with controlled block side chains. Using the polymerization sequence IBVE-functional monomer, the functional block is located at the end of the side chains. The opposite side chain structure will be obtained for the opposite polymerization sequence.

The graft copolymerization was carried out under conditions similar to those employed for the graft copolymers based on single functional monomers, but the polymerization of the third monomer was followed by that of the fourth monomer. FIG. 10 presents the GPC chromatograms of a graft copolymer consisting of a poly(MMA-co-AEEMA) backbone and poly(VEMA-b-IBVE) block side chains and of its precursors. Upon the completion of the first step graft cationic polymerization of VEMA, the peak (Peak a) of the backbone polymer RCP-4 (Table 4, $M_n$=11900, $M_w/M_n$ =1.05) disappeared and a single and symmetrical new Peak (Peak b) emerged in the higher molecular weight range, corresponding to a graft copolymer with poly(VEMA) side chains ($M_{n(GPC)}$=18800, $M_w/M_n$=1.12). To this polymerization system, IBVE was added in the same amount as VEMA and the reaction was allowed to last 3 hours. As illustrated in FIG. 10, Peak b shifted toward the higher molecular

TABLE 6

Preparation of graft copolymers with random copolymer side chains (GRP)[a]

| no. | backbone[b] | $[I]_0$[c] mM | monomer name | $[M]_0/M$ | $[IBVE]_0$ M | Time H | $M_k$[d] | $N$[e] | $10^{-4} M_n$ calcd | NMR[f] | GPC[g] | $M_w/M_n$[g] |
|---|---|---|---|---|---|---|---|---|---|---|---|---|
| GCP-1 | RCP-3 | 24.2 | AcVE | 0.186 | 0.242 | 6.5 | 2000 | 7.51 | 2.14 | 2.05 | 1.41 | 1.13 |
| GCP-2 | RCP-3 | 24.2 | ClVE | 0.226 | 0.242 | 6.5 | 2000 | 7.51 | 2.14 | 1.98 | 1.41 | 1.16 |
| GCP-3 | RCP-3 | 24.2 | VEMA | 0.155 | 0.242 | 6.5 | 2000 | 7.51 | 2.14 | 2.28 | 1.42 | 1.19 |
| GCP-4 | RCP-4 | 30.8 | AcVE | 0.240 | 0.313 | 4.0 | 2040 | 13.4 | 3.87 | 3.60 | 2.94 | 1.12 |

[a]–[g]See Table 5. The polymer yield was 100% in every case.

weight region to give a new Peak c which can be attributed to the graft copolymer with poly(VEMA-b-IBVE) side chains. Its $M_n$ determined by GPC ($M_{n(GPC)}$=29500) was larger than that obtained after the polymerization of VEMA and its $M_n$ determined by $^1$H NMR ($M_{n(NMR)}$=46800) was consistent with the calculated value ($M_{n(calcd)}$=45900). In addition, the MWD of the latter polymer ($M_w/M_n$=1.15) remained almost unchanged when compared to that in the first step ($M_w/M_n$=1.12). The above results confirmed again the living nature of the cationic graft-block copolymerization from a poly(MMA-co-AEEMA) backbone.

As shown in Tables 7 and 8, the graft copolymers with block side chains can be prepared using either the IBVE-functional monomer sequence or vice versa.

backbone and to the poly(AcVE) segment. The calculated composition and $M_n$ from the peak intensities were in agreement with the designed values. The above results indicate that a well-defined graft copolymer with block side chains can be prepared by the sequential living cationic block copolymerization of IBVE with AcVE, ClVE, or VEMA.

Although the invention has been described in detail for the purpose of illustration, it is understood that such detail is solely for that purpose, and variations can be made therein by those skilled in the art without departing from the spirit and scope of the invention which is defined by the following claims.

What is claimed:

TABLE 7

Preparation conditions of graft copolymers with block side chains (GBP)[a]

| No. | backbone[b] | $[I]_0$[c] mM | first step | | | | second step | | | |
|---|---|---|---|---|---|---|---|---|---|---|
| | | | monomer | $[M]_0/M$ | time/h | conv./% | monomer | $[M]_0/M$ | time/h | Conv./% |
| GBP-1 | RCP-2 | 32.1 | AcVE | 0.247 | 4 | 100 | IBVE | 0.370 | 3 | 100 |
| GBP-2 | RCP-2 | 32.1 | ClVE | 0.300 | 5 | 81 | IBVE | 0.415 | 3 | 100 |
| GBP-3 | RCP-4 | 24.2 | ClVE | 0.292 | 7 | 94 | IBVE | 0.313 | 3 | 100 |
| GBP-4 | RCP-3 | 24.2 | VEMA | 0.310 | 6 | 82 | IBVE | 0.417 | 3 | 100 |
| GBP-5 | RCP-4 | 24.2 | VEMA | 0.200 | 6 | 100 | IBVE | 0.313 | 3 | 100 |
| GBP-6 | RCP-2 | 32.1 | IBVE | 0.321 | 1 | 100 | AcVE | 0.247 | 4 | 100 |
| GBP-7 | RCP-4 | 24.2 | IBVE | 0.313 | 1 | 100 | AcVE | 0.240 | 4 | 87 |
| GBP-8 | RCP-4 | 24.2 | IBVE | 0.313 | 1 | 100 | ClVE | 0.292 | 7 | 41 |
| GBP-9 | RCP-4 | 24.2 | IBVE | 0.313 | 1 | 100 | VEMA | 0.200 | 6.5 | 63 |

[a]–[c]See Table 5.

TABLE 8

Characterization of graft copolymers with block side chains (GBP)

| no. | N[c] | $M_k$[d] | first step | | | | second step | | | |
|---|---|---|---|---|---|---|---|---|---|---|
| | | | $10^{-4} M_{n(GPC)}$[g] | $10^{-4} M_{n(GPC)}$[g] | $M_w/M_n$[g] | $M_k$[d] | $10^{-4} M_{n(NMR)}$[f] | $10^{-4} M_{n(GPC)}$[g] | $M_w/M_n$[g] | |
| GBP-1 | 16.8 | 1000 | 2.72 | 2.02 | 1.15 | 2150 | 4.65 | 4.34 | 3.81 | 1.22 |
| GBP-2 | 16.8 | 1000 | 2.72 | 1.78 | 1.18 | 2290 | 4.89 | 5.09 | 3.77 | 1.22 |
| GBP-3 | 13.4 | 1290 | 2.86 | 1.83 | 1.12 | 2580 | 4.59 | 4.70 | 3.14 | 1.16 |
| GBP-4 | 7.51 | 2000 | 2.14 | 1.11 | 1.13 | 3720 | 3.44 | 3.49 | 1.90 | 1.23 |
| GBP-5 | 13.4 | 1290 | 2.86 | 1.88 | 1.12 | 2580 | 4.59 | 4.68 | 2.95 | 1.15 |
| GBP-6 | 16.8 | 1000 | 2.72 | 2.10 | 1.17 | 2000 | 4.40 | 4.24 | 3.30 | 1.25 |
| GBP-7 | 13.4 | 1290 | 2.86 | 2.39 | 1.15 | 2410 | 4.36 | 4.21 | 3.18 | 1.18 |
| GBP-8 | 13.4 | 1290 | 2.86 | 2.35 | 1.15 | 1820 | 3.57 | 3.43 | 2.81 | 1.17 |
| GBP-9 | 13.4 | 1290 | 2.86 | 2.36 | 1.17 | 2100 | 3.95 | 3.97 | 2.84 | 1.16 |

[d]–[g]See Table 5.

However, the reactivity of the living site declines as the side chain becomes longer. For instance, comparing GBP-5 and GBP-9 (Table 7), one can observe that when VEMA was first polymerized, its conversion reached 100% in 6 hours (GBP-5), while, for the opposite sequence, the conversion of VEMA was 63% in 6.5 hours.

Similar results were obtained with AcVE and ClVE. This might be caused by the increased viscosity of the polymerization system.

Figure 12B:
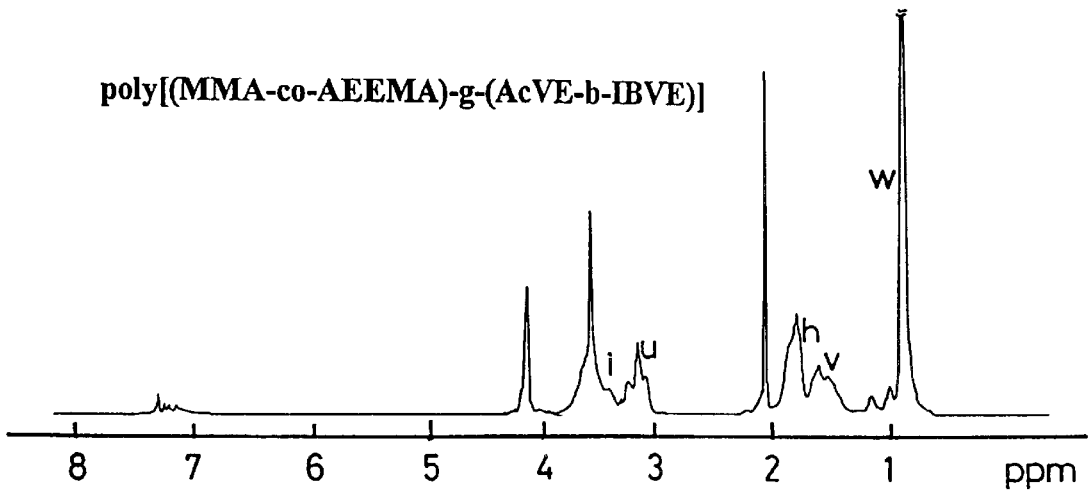

As shown in Tables 7 and 8, $M_n$ increased from the first to the second step, but the MWD remained narrow in all cases ($M_w/M_n$=1.16~1.25). FIG. 12B presents the $^1$H NMR spectrum of a graft copolymer with poly(AcVE-b-IBVE) side chains. Comparing FIGS. 12B and 11A, one can observe the presence of the absorptions h, i, u, v, and w, due to the poly(IBVE) segment, in addition to those due to the 1. A continuous method of preparing a block-graft or star-shaped copolymer comprising:

providing a living polymer;

mixing the living polymer with a first monomer under conditions effective to produce a block copolymer, wherein the first monomer comprises a living polymerization site and a living polymerization initiation site; and mixing the block copolymer with a second monomer under conditions effective to produce a block-graft or star-shaped copolymer.

2. The method according to claim 1, wherein the living polymer is selected from the group consisting of polystyrene, poly(α-methyl styrene), polybutadiene, polyisoprene, poly(methyl methacrylate), poly(ethyl methacrylate), polybutyl methacrylate), and poly(tert-butyl methacrylate).

3. The method according to claim 1, wherein the first monomer comprises an anionic polymerization site and a cationic polymerization initiation site.

4. The method according to claim 3, wherein the first monomer is selected from the group consisting of 2-(1-acetoxyethoxy)ethyl methacrylate, (trifluoroacetoxyethoxy)ethyl methacrylate, (chloroacetoxyethoxy)ethyl methacrylate, and (dichloroacetoxy)ethyl methacrylate.

5. The method according to claim 1, wherein the second monomer is selected from the group consisting of isobutyl vinyl ether, methyl vinyl ether, ethyl vinyl ether, butyl vinyl ether, tert-butyl vinyl ether, p-methoxystyrene, and p-tert-butoxystyrene.

6. The method according to claim 1 further comprising:
mixing the living polymer or the block copolymer with an activator.

7. The method according to claim 6, wherein the activator is selected from the group consisting of $AlCl_3$, $EtAlCl_2$, $Et_2AlCl$, $Et_3Al$, $ZnCl_2$, $ZnBr_2$, $ZnI_2$, $SnCl_2$, $SnCl_4$, $SnBr_4$, and $I_2$.

8. A block-graft or star-shaped copolymer having the formula:

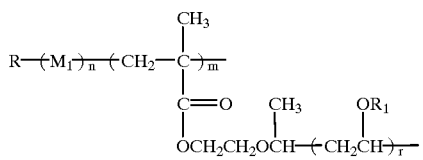

wherein
n is an integer,
m is an integer,
r is an integer, and n, m, and r are a predetermined polymerization degree,
R an alkyl,
$R_1$ is selected from the group consisting of an alkyl, 2-chloroethyl, 2-acetoxyethyl, and 2-methacryloyloxyethyl, and
$M_1$ is selected from the group consisting of styrene, α-methyl styrene, butadiene, isoprene, methyl methacrylate, ethyl methacrylate, butyl methacrylate, and tert-butyl methacrylate.

9. A continuous method of preparing a graft copolymer comprising:
mixing a first monomer and a second monomer under conditions effective to produce a copolymer of the first and second monomers, wherein the first monomer comprises a polymerization site and a polymerization initiation site, and
mixing the copolymer with a third monomer under conditions effective to produce a graft copolymer.

10. The method according to claim 9, wherein the first monomer comprises an anionic polymerization site and a cationic polymerization initiation site.

11. The method according to claim 10, wherein the first monomer is selected from the group consisting of 2-(1-acetoxyethoxy)ethyl methacrylate, (trifluoroacetoxyethoxy)ethyl methacrylate, (chloroacetoxyethoxy)ethyl methacrylate, and (dichloroacetoxy)ethyl methacrylate.

12. The method according to claim 9, wherein the second monomer is selected from the group consisting of methyl methacrylate, ethyl methacrylate, propyl methacrylate, isopropyl methacrylate, butyl methacrylate, aid tert-butyl methacrylate.

13. The method according to claim 9, wherein the third monomer is a functional monomer.

14. The method according to claim 13, wherein the third monomer is selected from the group consisting of isobutyl vinyl ether, 2-acetoxy vinyl ether, 2-chloroethyl vinyl ether, 2-vinyloxyethyl methacrylate, 2-methacryloyloxyethyl vinyl ether, protected ethylene glycol vinyl ether, protected di(ethylene glycol) vinyl ether, protected tri(ethylene glycol) vinyl ether, protected 1,4-butanediol vinyl ether, protected 1,6-hexanediol vinyl ether, and mixtures thereof.

15. The method according to claim 9, wherein the third monomer is a non-functional monomer.

16. The method according to claim 15, wherein the third monomer is selected from the group consisting of methyl vinyl ether, ethyl vinyl ether, butyl vinyl ether, tert-butyl vinyl ether, p-methoxystyrene, p-tert-butoxystyrene, and mixtures thereof.

17. The method according to claim 9 further comprising:
mixing the first and second monomers or the copolymer with an activator.

18. The method according to claim 17, wherein the activator is selected from the group consisting of $AlCl_3$, $EtAlCl_2$, $Et_2AlCl$, $Et_3Al$, $ZnCl_2$, $ZnBr_2$, $ZrI_2$, $ZnI_2$, $SnCl_2$, $SnCl_4$, $SnBr_4$, and $I_2$.

19. A graft copolymer having the formula:

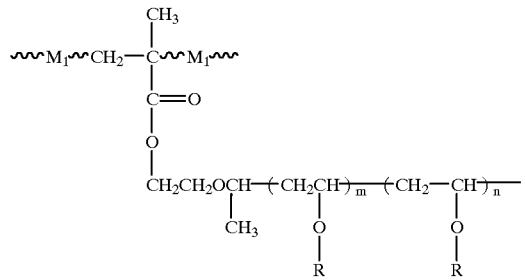

wherein
m is an integer,
n is an integer $\geq 0$,
R is the same or different and is selected from the group consisting of an alkyl, acetoxyethyl, chloroethyl, and methacryloyloxyethyl, and
$M_1$ is selected from the group consisting of methyl methacrylate, ethyl methacrylate, propyl methacrylate, isopropyl methacrylate, butyl methacrylate, tert-butyl methacrylate, and mixtures thereof.

20. A continuous method of preparing a graft-block copolymer comprising:
mixing a first monomer and a second monomer under conditions effective to produce a copolymer of the first and second monomers, wherein the first monomer comprises a living polymerization site and a living polymerization initiation site;
mixing the copolymer with a third monomer under conditions effective to produce a graft copolymer; and
mixing the graft copolymer with a fourth monomer under conditions effective to produce a graft-block copolymer.

21. The method according to claim 20, wherein the first monomer comprises an anionic polymerization site and a cationic polymerization initiation site.

22. The method according to claim 21, wherein the first monomer is selected from the group consisting of 2-(1-acetoxyethoxy)ethyl methacrylate, (trifluoroacetoxyethoxy)ethyl methacrylate, (chloroacetoxyethoxy)ethyl methacrylate, and (dichloracetoxyethoxy)ethyl methacrylate.

23. The method according to claim 20, wherein the second monomer is selected from the group consisting of methyl methacrylate, ethyl methacrylate, propyl methacrylate, isopropyl methacrylate, butyl methacrylate, and tert-butyl methacrylate.

24. The method according to claim 20, wherein the third monomer is a functional monomer.

25. The method according to claim 24, wherein the third monomer is selected from the group consisting of isobutyl vinyl ether, 2-acetoxy vinyl ether, 2-chloroethyl vinyl ether, 2-vinyloxyethyl methacrylate, 2-methacryloyloxyethyl vinyl ether, protected ethylene glycol vinyl ether, protected di(ethylene glycol) vinyl ether, protected tri(ethylene glycol) vinyl ether, protected 1,4-butanediol vinyl ether, protected 1,6-hexanediol vinyl ether, and mixtures thereof.

26. The method according to claim 20, wherein the third monomer is a non-functional monomer.

27. The method according to claim 26, wherein the third monomer is selected from the group consisting of methyl vinyl ether, ethyl vinyl ether, butyl vinyl ether, tert-butyl vinyl ether, p-methoxystyrene, p-tert-butoxystyrene, and mixtures thereof.

28. The method according to claim 20, wherein the fourth monomer is a functional monomer.

29. The method according to claim 28, wherein the third monomer is selected from the group consisting of isobutyl vinyl ether, 2-acetoxy vinyl ether, 2-chloroethyl vinyl ether, 2-vinyloxyethyl methacrylate, 2-methacryloyloxyethyl vinyl ether, protected ethylene glycol vinyl ether, protected di(ethylene glycol) vinyl ether, protected tri(ethylene glycol) vinyl ether, protected 1,4-butanediol vinyl ether, protected 1,6-hexanediol vinyl ether, and mixtures thereof.

30. The method according to claim 20, wherein the fourth monomer is a non-functional monomer.

31. The method according to claim 30, wherein the third monomer is selected from the group consisting of methyl vinyl ether, ethyl vinyl ether, butyl vinyl ether, tert-butyl vinyl ether, p-methoxystyrene, p-tert-butoxystyrene, and mixtures thereof.

32. The method according to claim 20 further comprising:
    mixing the first and second monomers, the copolymer, or the graft copolymer with an activator.

33. The method according to claim 32, wherein the activator is selected from the group consisting of $AlCl_3$, $EtAlCl_2$, $Et_2AlCl$, $Et_3Al$, $ZnCl_2$, $ZnBr_2$, $ZnI_2$, $SnCl_2$, $SnCl_4$, $SnBr_4$, and $I_2$.

34. A graph-block copolymer having the formula:

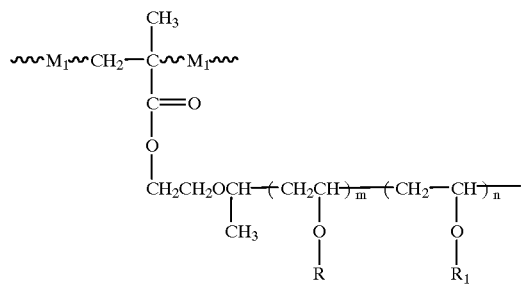

where
  m is an integer,
  n is an integer,
  R is the same or different and is selected from the group consisting of acetoxyethyl, chloroethyl, methacryloyloxyethyl, isobutyl, butyl, ethyl, methyl, and mixtures thereof,
  $R_1$ is the same or different and is selected from the group consisting of acetoxyethyl, chloroethyl, methacryloyloxyethyl, isobutyl, butyl, ethyl, methyl, and mixtures thereof, and
  $M_1$ is selected from the group consisting of methyl methacrylate, ethyl methacrylate, propyl methacrylate, isopropyl methacrylate, butyl methacrylate, and tert-butyl methacrylate.

* * * * *